(12) United States Patent
Noguchi et al.

(10) Patent No.: US 12,534,852 B2
(45) Date of Patent: Jan. 27, 2026

(54) INK COMPOSITION FOR INK JET TEXTILE PRINTING AND RECORDING METHOD

(71) Applicant: Seiko Epson Corporation, Tokyo (JP)

(72) Inventors: Hiromi Noguchi, Shiojiri (JP);
Shintaro Hama, Matsumoto (JP);
Hidehiko Komatsu, Chino (JP);
Yasuhiro Oki, Matsumoto (JP); Hisashi Okamura, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 1034 days.

(21) Appl. No.: 17/562,239

(22) Filed: Dec. 27, 2021

(65) Prior Publication Data

US 2022/0205175 A1    Jun. 30, 2022

(30) Foreign Application Priority Data

Dec. 28, 2020    (JP) ................. 2020-218883

(51) Int. Cl.
*D06P 5/30*    (2006.01)
*C09D 11/32*    (2014.01)

(52) U.S. Cl.
CPC ............. *D06P 5/30* (2013.01); *C09D 11/32* (2013.01)

(58) Field of Classification Search
CPC ....... C09D 11/32; C09D 11/38; C09D 11/328; D06M 13/358; D06P 5/30; D06P 1/38; D06P 1/6426
See application file for complete search history.

(56) References Cited

U.S. PATENT DOCUMENTS 4,063,877 A * 12/1977 Elliot .................. D06P 3/10
                                              8/102
2019/0249025 A1 * 8/2019 Miyajima ............ D06P 5/30

FOREIGN PATENT DOCUMENTS

EP          3572471 A1    11/2019
JP          H6-57162 A *    3/1994

(Continued)

OTHER PUBLICATIONS

Machine English translation of Nakato et al, JPH6-57162A, Mar. 1, 1994. (Year: 2025).*

(Continued)

*Primary Examiner* — Coris Fung
*Assistant Examiner* — Caroline D. Liott
(74) *Attorney, Agent, or Firm* — Harness, Dickey & Pierce, P.L.C.

(57) ABSTRACT

An ink composition for ink jet textile printing of the present disclosure contains a color material, a water-soluble organic solvent, and water, and the color material contains a color material A represented by Formula (1) below, a color material B represented by Formula (2) below, and a color material C that has a triazine structure and is different from the color material A and the color material B.

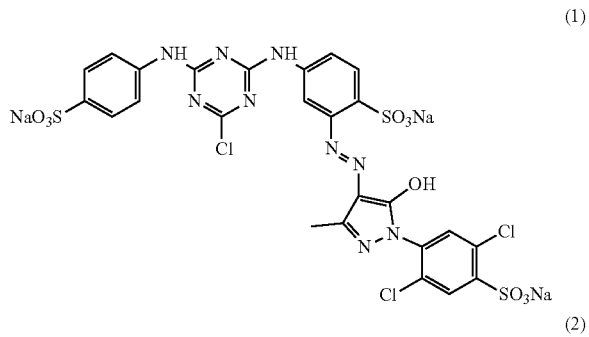

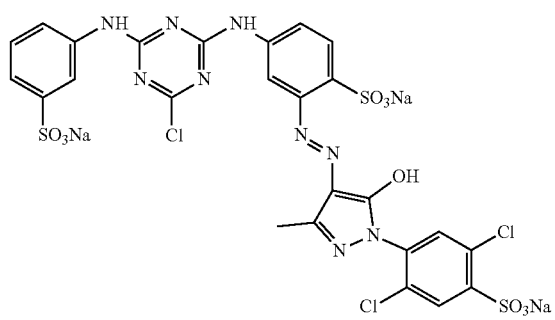

6 Claims, 15 Drawing Sheets

(56) References Cited

FOREIGN PATENT DOCUMENTS

| | | | | |
|---|---|---|---|---|
| JP | 2005047990 | A | * | 2/2005 |
| JP | 2007-248853 | A | * | 9/2007 |
| WO | 2018-135419 | A1 | | 7/2018 |

OTHER PUBLICATIONS

Machine English translation of Asami et al, JP 2007248853A, Sep. 27, 2007. (Year: 2025).*
Machine English translation of Taniguchi Makoto, JP-2005047990-A, Feb. 24, 2005. (Year: 2025).*

* cited by examiner

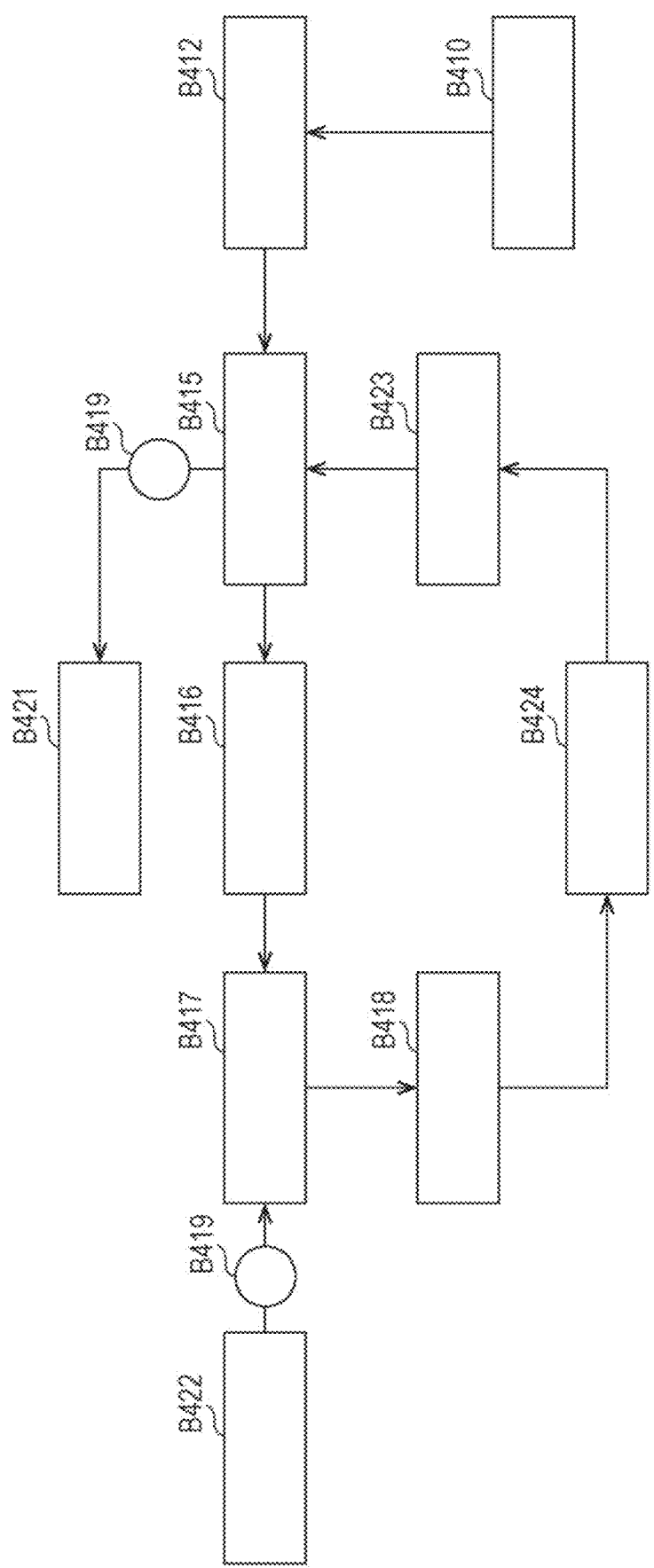

INK COMPOSITION FOR INK JET TEXTILE PRINTING AND RECORDING METHOD

The present application is based on, and claims priority from JP Application Serial Number 2020-218883, filed Dec. 28, 2020, the disclosure of which is here by incorporated by reference herein in its entirety.

BACKGROUND

1. Technical Field

The present disclosure relates to an ink composition for ink jet textile printing and a recording method.

2. Related Art

In recent years, the use applications of ink jet printing have increased, and ink jet printing has been applied not only to printing machines for offices and homes but also to commercial printing, textile printing, and the like.

Ink jet inks are required to have excellent stability in discharge by an ink jet method in order to form desired patterns.

Furthermore, ink compositions for ink jet textile printing, which are ink jet inks applicable to fabrics, have also been used.

C.I. Reactive Yellow 2 exhibits favorable color development and has excellent light fastness, and therefore, this color material has been applied also to ink compositions for ink jet textile printing (see, for example, International Publication No. 2018/135419).

However, C.I. Reactive Yellow 2 has low water solubility, and an aqueous ink jet ink including C.I. Reactive Yellow 2 is inferior in terms of the clogging recovery of ink jet nozzles, that is, there has been a problem that once clogging occurs in an ink jet nozzle which discharges an ink jet ink, even if cleaning is performed, it is difficult to recover the clogged nozzle.

SUMMARY

The present disclosure has been made to solve the above-mentioned problems and can be realized as the following aspects and application examples.

An ink composition for ink jet textile printing according to an application example of an aspect of the present disclosure contains a color material, a water-soluble organic solvent, and water, in which the color material contains a color material A represented by Formula (1) below, a color material B represented by Formula (2) below, and a color material C that has a triazine structure and that is different from the color material A and the color material B.

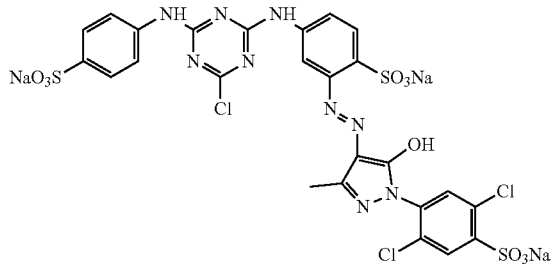

(1)

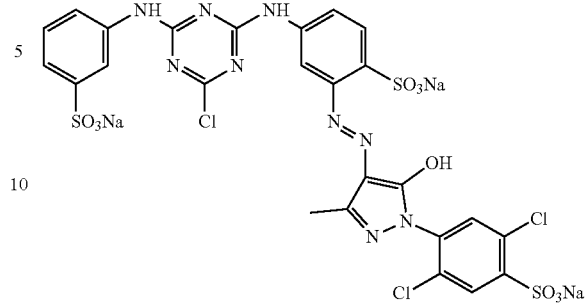

(2)

Furthermore, in the ink composition for ink jet textile printing according to another application example of the aspect of the present disclosure, the color material C is C.I. Reactive Yellow 95 or C.I. Reactive Orange 12.

In the ink composition for ink jet textile printing according to another application example of the aspect of the present disclosure, a ratio of a content of the color material A to a content of the color material B in the ink composition for ink jet textile printing is 2.0:3.0 to 3.0:2.0 in terms of mass ratio.

In the ink composition for ink jet textile printing according to another application example of the aspect of the present disclosure, a ratio of a sum of a content of the color material A and a content of the color material B to a content of the color material C in the ink composition for ink jet textile printing is 1.0:2.0 to 4.0:1.0 in terms of mass ratio.

In the ink composition for ink jet textile printing according to another application example of the aspect of the present disclosure, the water-soluble organic solvent contains a component having an SP value of 14 or less.

In the ink composition for ink jet textile printing according to another application example of the aspect of the present disclosure, a ratio of a content of the component having the SP value of 14 or less to a total amount of the color material in the ink composition for ink jet textile printing is 0.5 or more in terms of mass ratio.

In the ink composition for ink jet textile printing according to another application example of the aspect of the present disclosure, a ratio of the content of the component having the SP value of 14 or less to a total amount of the color material C in the ink composition for ink jet textile printing is 1.0 or more in terms of mass ratio.

A recording method according to an application example of an aspect of the present disclosure includes discharging the ink composition for ink jet textile printing according to the aspect of the present disclosure by an ink jet method and attaching the ink composition for ink jet textile printing to a recording medium.

BRIEF DESCRIPTION OF THE DRAWINGS

FIG. 15 is a block diagram showing an example of an ink circulation system in the ink jet device according to the second embodiment.

DESCRIPTION OF EXEMPLARY EMBODIMENTS

Figure 1:
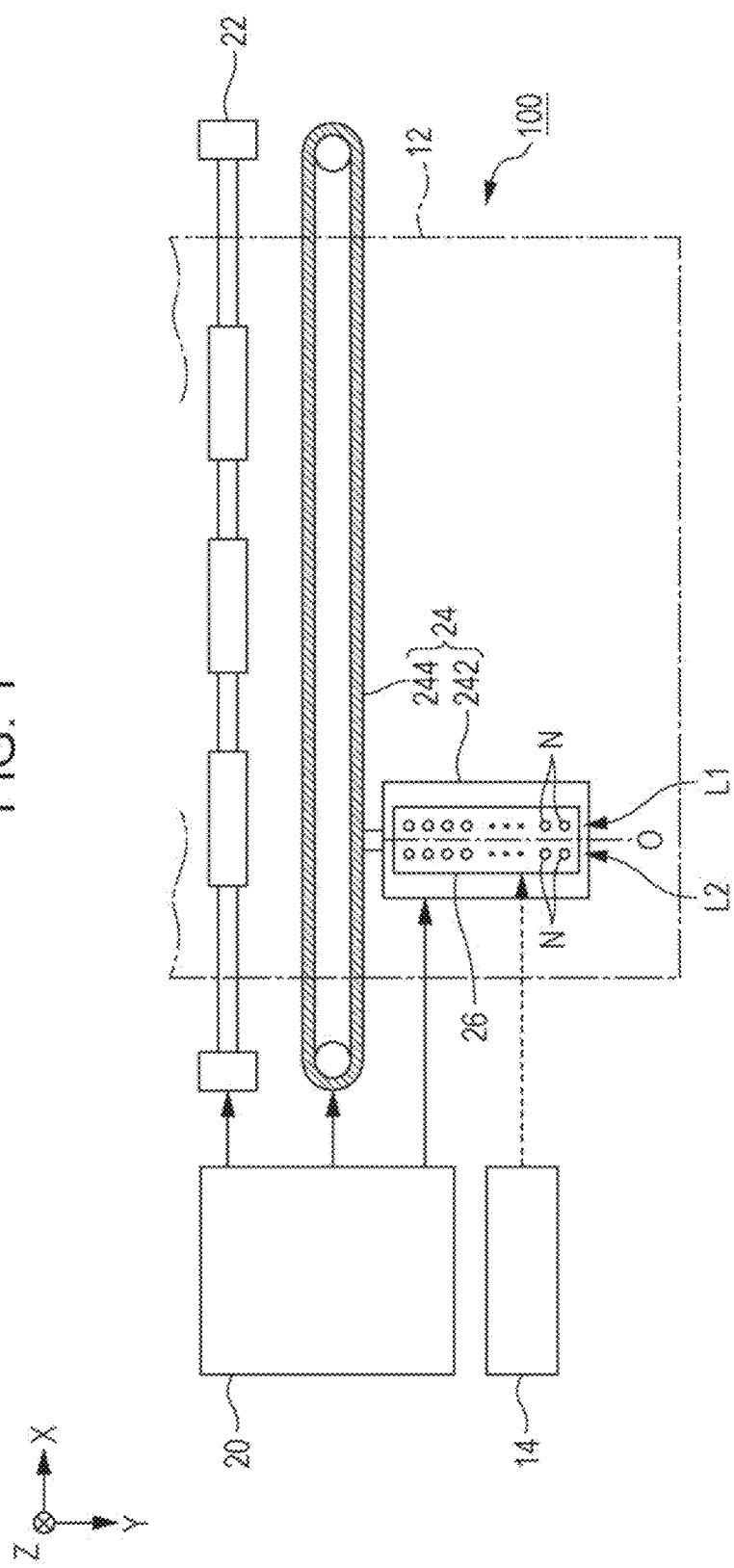
FIG. 1 is a configuration diagram of an ink jet device according to a first embodiment.

In the following description, preferred embodiments of the present disclosure will be described in detail.

1. Ink Composition for Ink Jet Textile Printing

First, the ink composition for ink jet textile printing of the present disclosure will be described.

The ink composition for ink jet textile printing of the present disclosure contains a color material, a water-soluble organic solvent, and water. Further, the color material contains a color material A represented by Formula (1) below, a color material B represented by Formula (2) below, and a color material C that has a triazine structure and that is different from the color material A and the color material B:

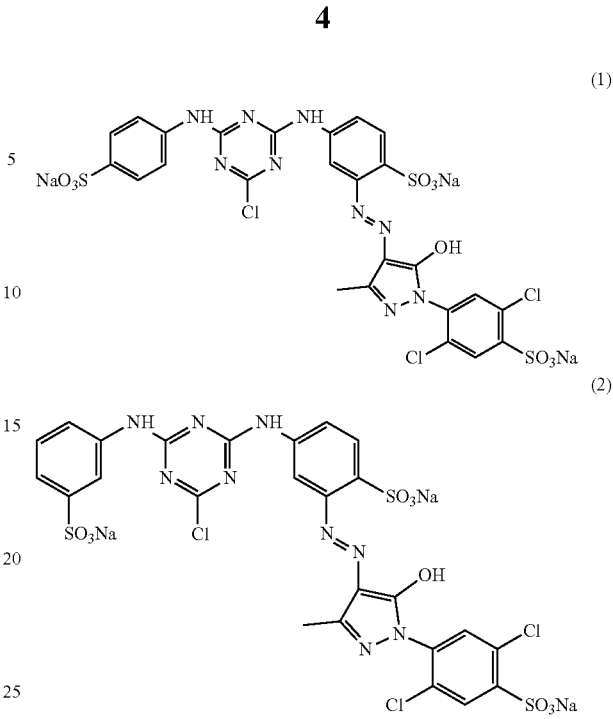

As a result, an ink composition for ink jet textile printing that includes C.I. Reactive Yellow 2 represented by Formula (1), has excellent stability in discharge by an ink jet method, and is also excellent in terms of clogging recovery.

It is considered that such an excellent effect can be obtained for the following reasons. That is, while causing the color material A to sufficiently exhibit the features of having favorable color development and excellent light fastness, when the color material B and the color material C are used in combination, the π-electron interaction between the molecules of the color material A can be suppressed, aggregation of the color material A in the ink composition for ink jet textile printing can be effectively suppressed, and the solubility of the color material A can be enhanced. It is considered that as a result, the stability of the ink composition for ink jet textile printing in discharge by an ink jet method can be made excellent, and the clogging recovery can also be made excellent.

In contrast, when conditions such as described above are not satisfied, satisfactory results are not obtained.

For example, when the ink composition for ink jet textile printing does not include the color material A, the features of the color material A of having, for example, favorable color development and excellent light fastness cannot be exhibited.

Furthermore, when the ink composition for ink jet textile printing does not include the color material B, even if the ink composition for ink jet textile printing includes the color material C, aggregation of the color material A in the ink composition for ink jet textile printing cannot be sufficiently suppressed, and the solubility of the color material A is low. As a result, the ink composition for ink jet textile printing cannot have sufficiently excellent stability in discharge by an ink jet method and sufficiently excellent clogging recovery.

Furthermore, when the ink composition for ink jet textile printing does not include the color material C, even if the ink composition for ink jet textile printing includes the color material B, aggregation of the color material A in the ink composition for ink jet textile printing cannot be sufficiently suppressed, and the solubility of the color material A is low. As a result, the ink composition for ink jet textile printing cannot have sufficiently excellent stability in discharge by an ink jet method and sufficiently excellent clogging recovery.

According to the present disclosure, the ink composition for ink jet textile printing refers to an ink that is subjected to discharge by an ink jet method and is used for textile printing.

1-1. Color Material

The ink composition for ink jet textile printing of the present disclosure includes, as color materials, at least three components. That is, the ink composition for ink jet textile printing of the present disclosure contains, as color materials, a color material A represented by the above-described Formula (1), a color material B represented by the above-described Formula (2), and a color material C that has a triazine structure and that is different from the color material A and the color material B.

The content of the color material in the ink composition for ink jet textile printing of the present disclosure is preferably from 1.2% by mass to 25% by mass, more preferably from 3.0% by mass to 20% by mass, and even more preferably from 5.0% by mass to 15% by mass.

As a result, it is easier to secure a sufficient color density in a recording section formed by using the ink composition for ink jet textile printing, and also, the storage stability, discharge stability, clogging recovery, and the like of the ink composition for ink jet textile printing can be made superior.

1-1-1. Color Material A

The ink composition for ink jet textile printing of the present disclosure includes a color material A represented by the above-described Formula (1), which is a reactive dye. Such a color material A has a feature of having favorable color development and excellent light fastness.

The content of the color material A in the ink composition for ink jet textile printing of the present disclosure is preferably from 0.3% by mass to 7.0% by mass, more preferably from 0.5% by mass to 5.0% by mass, and even more preferably from 1.0% by mass to 3.0% by mass.

As a result, the storage stability, discharge stability, clogging recovery, and the like of the ink composition for ink jet textile printing can be made superior, while the color developability and light fastness of a recording section formed by using the ink composition for ink jet textile printing are made more favorable.

The content of the color material A with respect to the entirety of the color material included in the ink composition for ink jet textile printing of the present disclosure is preferably from 5.0% by mass to 50% by mass, more preferably from 8.0% by mass to 45% by mass, and even more preferably from 16% by mass to 40% by mass.

As a result, the storage stability, discharge stability, clogging recovery, and the like of the ink composition for ink jet textile printing can be made superior, while the color developability and light fastness of a recording section formed by using the ink composition for ink jet textile printing are made more favorable.

1-1-2. Color Material B

The ink composition for ink jet textile printing of the present disclosure includes a color material B represented by the above-described Formula (2), which is a reactive dye.

Such a color material B is an important component for enhancing the storage stability, discharge stability, clogging recovery, and the like of the ink composition for ink jet textile printing while effectively preventing the excellent color developability and color tone of the color material A from being impaired.

The content of the color material B in the ink composition for ink jet textile printing of the present disclosure is preferably from 0.4% by mass to 11% by mass, more preferably from 0.7% by mass to 8.0% by mass, and even more preferably from 1.5% by mass to 4.5% by mass.

As a result, the storage stability, discharge stability, clogging recovery, and the like of the ink composition for ink jet textile printing can be made superior, while the color developability and light fastness of a recording section formed by using the ink composition for ink jet textile printing are made more favorable.

The content of the color material B with respect to the entirety of the color material included in the ink composition for ink jet textile printing of the present disclosure is preferably from 6.0% by mass to 65% by mass, more preferably from 12% by mass to 50% by mass, and even more preferably from 24% by mass to 35% by mass.

As a result, the storage stability, discharge stability, clogging recovery, and the like of the ink composition for ink jet textile printing can be made superior, while the color developability and light fastness of a recording section formed by using the ink composition for ink jet textile printing are made more favorable.

The ratio of the content of the color material A to the content of the color material B, in terms of mass ratio, in the ink composition for ink jet textile printing, that is, the ratio $XA:XB$, where the content of the color material A is denoted by $XA$ [% by mass] and the content of the color material B is denoted by $XB$ [% by mass], is preferably from 2.0:3.0 to 3.0:2.0.

As a result, the storage stability, discharge stability, clogging recovery, and the like of the ink composition for ink jet textile printing can be made superior, while the color developability and light fastness of a recording section formed by using the ink composition for ink jet textile printing are made more favorable.

1-1-3. Color Material C

The ink composition for ink jet textile printing of the present disclosure includes a color material C that has a triazine structure and that is different from both the color material A and the color material B.

As a result, the storage stability, discharge stability, clogging recovery, and the like of the ink composition for ink jet textile printing can be made superior, while the color developability and light fastness of a recording section formed by using the ink composition for ink jet textile printing are made more favorable.

The color material C is not particularly limited as long as it has a triazine structure and is different from both the color material A and the color material B; however, the color material C is preferably a reactive dye, and more preferably a reactive dye having a chlorotriazine group.

Examples of the color material C include C.I. Reactive Yellow 95 represented by the following Formula (3) and C.I. Reactive Orange 12 represented by the following Formula (4), and these can be used alone or in combination of two or more thereof; however, above all, the color material C is preferably C.I. Reactive Yellow 95 or C.I. Reactive Orange 12.

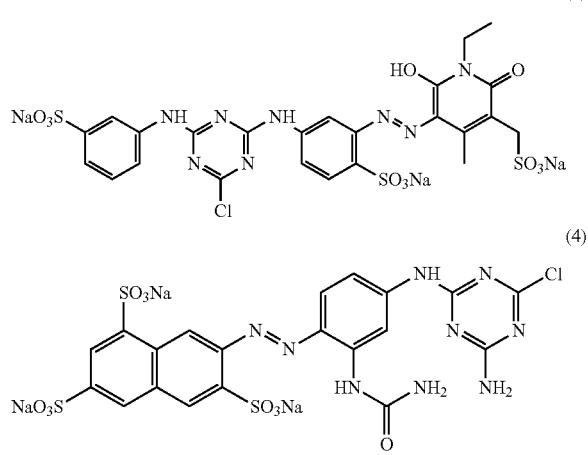

(3)

(4)

As a result, the storage stability, discharge stability, clogging recovery, and the like of the ink composition for ink jet textile printing can be made further superior, while the color developability and light fastness of a recording section formed by using the ink composition for ink jet textile printing are made even more favorable.

The content of the color material C in the ink composition for ink jet textile printing of the present disclosure is preferably from 0.5% by mass to 15% by mass, more preferably from 1.0% by mass to 12% by mass, and even more preferably from 1.8% by mass to 7.5% by mass.

As a result, the storage stability, discharge stability, clogging recovery, and the like of the ink composition for ink jet textile printing can be made further superior, while the color developability and light fastness of a recording section formed by using the ink composition for ink jet textile printing are made even more favorable.

When the ink composition for ink jet textile printing of the present disclosure includes a plurality of components as the color material C, it is preferable that the sum of the contents of these components is a value within the above-described range.

The content of the color material C with respect to the entirety of the color material included in the ink composition for ink jet textile printing of the present disclosure is preferably from 25% by mass to 80% by mass, more preferably from 30% by mass to 75% by mass, and even more preferably from 40% by mass to 60% by mass.

As a result, the storage stability, discharge stability, clogging recovery, and the like of the ink composition for ink jet textile printing can be made further superior, while the color developability and light fastness of a recording section formed by using the ink composition for ink jet textile printing are made even more favorable.

The ratio, in terms of mass ratio, of the sum of the content of the color material A and the content of the color material B to the content of the color material C in the ink composition for ink jet textile printing, that is, the ratio (XA+XB):XC, where the content of the color material A is denoted by XA [% by mass], the content of the color material B is denoted by XB [% by mass], and the content of the color material C is denoted by XC [% by mass], is preferably from 1.0:2.0 to 4.0:1.0, more preferably from 1.2:1.8 to 3.5:1.5, and even more preferably from 1.3:1.7 to 3.0:2.0.

As a result, the storage stability, discharge stability, clogging recovery, and the like of the ink composition for ink jet textile printing can be made further superior, while the color developability and light fastness of a recording section formed by using the ink composition for ink jet textile printing are made even more favorable.

1-1-4. Other Color Materials

The ink composition for ink jet textile printing of the present disclosure includes a color material A, a color material B, and a color material C as the color materials; however, the ink composition for ink jet textile printing may further include a color material other than these. Hereinafter, a color material other than the color material A, color material B, and color material C will be also referred to as "other color material".

The content of the other color material in the ink composition for ink jet textile printing of the present disclosure is preferably 0.5% by mass or less, more preferably 0.3% by mass or less, and even more preferably 0.1% by mass or less.

When the ink composition for ink jet textile printing of the present disclosure includes a plurality of components as the other color material, the sum of the contents of these components is preferably a value within the above-described range.

The content of the other color material with respect to the entirety of the color material included in the ink composition for ink jet textile printing of the present disclosure is preferably 10% by mass or less, more preferably 5.0% by mass or less, and even more preferably 1.0% by mass or less.

1-2. Water-Soluble Organic Solvent

The ink composition for ink jet textile printing of the present disclosure includes a water-soluble organic solvent.

As a result, the moisture-retaining property of the ink composition for ink jet textile printing can be enhanced, and the solid content of the ink composition for ink jet textile printing can be effectively prevented from being unintentionally precipitated due to drying at the ink jet head or the like. Furthermore, the viscosity of the ink composition for ink jet textile printing can be adjusted more suitably. For this reason, the stability of the ink composition for ink jet textile printing in discharge by an ink jet method can be made superior.

The water-soluble organic solvent may be any organic solvent that exhibits solubility in water, and for example, an organic solvent having a solubility in water at 20° C. of 10 g/100 g of water or more can be suitably used.

The boiling point of the water-soluble organic solvent at 1 atmosphere is preferably from 150° C. to 350° C.

As a result, the moisture-retaining property of the ink composition for ink jet textile printing can be further enhanced, and the solid content of the ink composition for ink jet textile printing can be effectively prevented from being unintentionally precipitated due to drying at the ink jet head or the like. For this reason, the stability of the ink composition for ink jet textile printing in discharge by an ink jet method can be made superior. After the ink composition for ink jet textile printing is discharged, the ink composition can be volatilized relatively easily when necessary, and the water-soluble organic solvent can be more effectively prevented from unintentionally remaining in a produced dyed product.

Examples of such a water-soluble organic solvent include an alkyl monoalcohol; an alkyl diol; glycerin; a glycol; a glycol monoether; and a lactam, and these can be used alone or in combination of two or more thereof.

Examples of the glycol include triethanolamine; ethylene glycol, diethylene glycol, triethylene glycol, and propylene glycol. Examples of the glycol monoether include triethylene glycol monobutyl ether. Examples of the lactam include 2-pyrrolidone.

Particularly, it is preferable that the water-soluble organic solvent included in the ink composition for ink jet textile printing of the present disclosure contains a component having an SP value of 14 or less.

As a result, the occurrence of bleeding in a recording section formed by using the ink composition for ink jet textile printing of the present disclosure can be prevented more effectively.

Examples of the constituent component having an SP value of 14 or less of the water-soluble organic solvent include triethylene glycol monobutyl ether (SP value: 10.2), diethylene glycol (SP value: 13.7), 2-pyrrolidone (SP value: 10.9), 1,2-hexanediol (SP value: 12.2), diethylene glycol monobutyl ether (SP value: 10.0), and N-(2-hydroxyethyl)-2-pyrrolidone (SP value: 12.5), and these can be used alone or in combination of two or more thereof; however, above all, triethylene glycol monobutyl ether (SP value: 10.2), diethylene glycol (SP value: 13.7), and 2-pyrrolidone (SP value: 10.9) are preferred.

Even when a component having an SP value of 14 or less is used as the constituent component of the water-soluble organic solvent, the component may be used in combination with a component having an SP value of more than 14.

Examples of the constituent component having an SP value of more than 14 of the water-soluble organic solvent include propylene glycol (SP value: 14.2), ethylene glycol (SP value: 16.1), and glycerin (SP value: 16.7), and these can be used alone or in combination of two or more thereof.

However, when a component having an SP value of 14 or less is used as a constituent component of the water-soluble organic solvent, the proportion of the component having an SP value of 14 or less in the entirety of the water-soluble organic solvent included in the ink composition for ink jet textile printing of the present disclosure is preferably 60% by mass or more, more preferably 80% by mass or more, and even more preferably 90% by mass or more. As a result, the above-mentioned effect is more notably exhibited.

The ratio of the content of the component having an SP value of 14 or less, that is, the component having an SP value of 14 or less among the constituent components of the water-soluble organic solvent, with respect to the total amount of the color material in the ink composition for ink jet textile printing of the present disclosure is preferably 0.5 or more, more preferably from 0.7 to 10, and even more preferably from 1.0 to 5.0, in terms of mass ratio.

As a result, the occurrence of bleeding in a recording section formed by using the ink composition for ink jet textile printing of the present disclosure can be prevented even more effectively.

The ratio of the content of the component having an SP value of 14 or less, that is, the component having an SP value of 14 or less among the constituent components of the water-soluble organic solvent, with respect to the total amount of the color material C in the ink composition for ink jet textile printing of the present disclosure is preferably 1.0 or more, more preferably from 1.4 to 20, and even more preferably from 2.0 to 10, in terms of mass ratio.

As a result, the occurrence of bleeding in a recording section formed by using the ink composition for ink jet textile printing of the present disclosure can be prevented even more effectively.

The content of the water-soluble organic solvent in the ink composition for ink jet textile printing of the present disclosure is preferably from 4.0% by mass to 40% by mass, more preferably from 9.0% by mass to 35% by mass, and even more preferably from 11% by mass to 30% by mass.

As a result, the moisture-retaining property of the ink composition for ink jet textile printing can be enhanced more suitably, while making the viscosity of the ink composition for ink jet textile printing more suitable. Consequently, the stability of the ink composition for ink jet textile printing in discharge by an ink jet method can be made superior.

1-3. Water

The ink composition for ink jet textile printing of the present disclosure includes water. Water is usually a main component of the ink composition for ink jet textile printing and functions as a solvent for the above-described color material. By including such water, the ink composition for ink jet textile printing acquires suitable fluidity and viscosity, and discharge by an ink jet method can be suitably performed. Furthermore, damage to the recording medium to which the ink composition for ink jet textile printing is applied, particularly a fabric, can be suppressed more effectively. It is also preferable from the viewpoint of suppressing the problem of volatile organic compounds (VOCs).

The content of water in the ink composition for ink jet textile printing is not particularly limited; however, the content is preferably from 40% by mass to 80% by mass, more preferably from 45% by mass to 75% by mass, and even more preferably from 50% by mass to 70% by mass.

As a result, the discharge stability and the like of the ink composition for ink jet textile printing can be made superior, while making the contents of the color material and the like sufficiently high.

Furthermore, when the content of water in the ink composition for ink jet textile printing is denoted by XW [% by mass], and the content of the water-soluble organic solvent in the ink composition for ink jet textile printing is denoted by XH [% by mass], the ratio XH/XW is preferably from 0.050 to 0.50, more preferably from 0.10 to 0.45, and even more preferably from 0.15 to 0.43.

As a result, the moisture-retaining property of the ink composition for ink jet textile printing can be enhanced more suitably, while making the viscosity of the ink composition for ink jet textile printing more suitable. Consequently, the stability of the ink composition for ink jet textile printing in discharge by an ink jet method, and the like can be made superior.

1-4. Urea

The ink composition for ink jet textile printing of the present disclosure may include a urea.

A urea functions as a humectant for an ink composition for ink jet textile printing or functions as a dyeing aid that enhances the dyeing affinity of the color material, particularly a reactive dye.

Examples of the urea include urea, ethylene urea, tetramethylurea, thiourea, and 1,3-dimethyl-2-imidazolidinone.

The content of the urea in the ink composition for ink jet textile printing is preferably from 0.50% by mass to 10% by mass, more preferably from 1.0% by mass to 8.0% by mass, and even more preferably from 1.5% by mass to 6.0% by mass.

As a result, the content of the color material and the like in the ink composition for ink jet textile printing can be prevented from lowering, and the effect of including a urea as described above is more notably exhibited, while sufficiently exhibiting these functions.

1-5. Other Component

The ink composition for ink jet textile printing of the present disclosure may also include a component other than the above-mentioned components. Hereinafter, such a component will also be referred to as "other component".

Examples of the other component include a pH adjusting agent; a chelating agent; an antiseptic agent or antifungal agent; a rust preventive agent; a flameproofing agent; various dispersants; a surfactant; an oxidation inhibitor; an ultraviolet absorber; an oxygen absorber; a dissolution aid; and a penetrant.

Examples of the chelating agent include an ethylenediaminetetraacetate. Examples of an antiseptic agent or antifungal agent include sodium benzoate, sodium pentachlorophenol, sodium 2-pyridinethiol-1-oxide, sodium sorbate, sodium dehydroacetate, 1,2-dibenzoisothiazolin-3-one, and 4-chloro-3-methylphenol. Examples of the rust preventive agent include benzotriazole and the like.

Regarding the antiseptic agent or antifungal agent, for example, a compound having an isothiazoline ring structure in the molecule can be suitably used.

Regarding the surfactant, for example, various surfactants such as an anionic surfactant, a cationic surfactant, and a nonionic surfactant can be used.

The content of the other component is preferably 6.0% by mass or less, and more preferably 5.0% by mass or less. The lower limit of the content of the other component is 0% by mass.

1-6. Others

The surface tension of the ink composition for ink jet textile printing of the present disclosure at 25° C. is not particularly limited; however, the surface tension is preferably from 20 mN/m to 50 mN/m, more preferably from 21 mN/m to 45 mN/m, and even more preferably from 23 mN/m to 43 mN/m.

As a result, clogging of the nozzles of the ink jet head is less likely to occur, and the discharge stability of the ink composition for ink jet textile printing is further enhanced. Furthermore, even when clogging of the nozzles occurs, the recovery achieved by capping the nozzles can be made superior.

Regarding the surface tension, a value measured by a Wilhelmy method can be employed. Measurement of the surface tension can be performed by using a surface tension meter (for example, manufactured by Kyowa Interface Science Co., Ltd., CBVP-7 or the like).

The viscosity of the ink composition for ink jet textile printing of the present disclosure at 25° C. is preferably from 2 mPa·s to 10 mPa·s, more preferably from 3 mPa·s to 8 mPa·s, and even more preferably from 4 mPa·s to 6 mPa·s.

As a result, the stability of the ink composition for ink jet textile printing in discharge by an ink jet method is superior.

The viscosity can be determined by measurement based on JIS Z8809 using a vibration type viscometer.

The ink composition for ink jet textile printing of the present disclosure may be any ink composition for ink jet textile printing that is used for discharge by an ink jet method, and examples of the ink jet method include on-demand methods such as a charge deflection method, a continuous method, a piezoelectric method, and a BUBBLE JET (registered trademark) method; however, it is particularly preferable that the ink composition for ink jet textile printing of the present disclosure is discharged from an ink jet head which uses a piezoelectric oscillator.

As a result, denaturation of the color material in the ink jet head can be prevented more effectively, and the stability in discharge by an ink jet method can be made superior.

Furthermore, it is preferable that the ink composition for ink jet textile printing of the present disclosure is discharged by an ink jet device provided with a circulation path for circulating the ink composition for ink jet textile printing in a pressure chamber of the ink jet head.

As a result, local drying of the ink in the vicinity of the nozzle can be effectively prevented, and therefore, it is possible to more effectively prevent the solid content of the ink composition for ink jet textile printing from being unintentionally precipitated For such a reason, the stability and the like of the ink composition for ink jet textile printing in discharge by an ink jet method can be made superior.

The ratio of the circulating flow rate of the ink composition for ink jet textile printing with respect to the maximum discharge amount of the ink jet head is not particularly limited; however, the ratio is preferably from 0.05 to 20, more preferably from 0.07 to 15, and even more preferably from 0.10 to 10. As a result, the above-mentioned effect is more notably exhibited.

An ink jet device for discharging the ink composition for ink jet textile printing of the present disclosure will be described in detail later.

2. Ink Composition Set for Ink Jet Textile Printing

Next, an ink composition set for ink jet textile printing according to the present disclosure will be described.

The ink composition set for ink jet textile printing according to the present disclosure includes a plurality of ink compositions for ink jet textile printing. Further, at least one ink composition for ink jet textile printing constituting the ink composition set for ink jet textile printing is the above-mentioned ink composition for ink jet textile printing of the present disclosure.

Among a plurality of the ink compositions for ink jet textile printing constituting the ink composition set for ink jet textile printing according to the present disclosure, at least one may be the above-mentioned ink composition for ink jet textile printing of the present disclosure, and the ink composition set for ink jet textile printing according to the present disclosure may include an ink composition for ink jet textile printing other than the above-mentioned ink composition for ink jet textile printing of the present disclosure.

It is preferable that the ink composition set for ink jet textile printing according to the present disclosure includes three ink compositions for ink jet textile printings corresponding to the three primary colors, namely, cyan, magenta, and yellow. The three primary colors may be further subdivided according to the color densities of the colors. For example, the ink composition set for ink jet textile printing may also include light cyan, light magenta, and light yellow, in addition to cyan, magenta, and yellow.

Furthermore, it is preferable that the ink composition set for ink jet textile printing according to the present disclosure further includes an achromatic ink, more specifically, a black ink, in addition to the above-mentioned color inks.

3. Recording Method

Next, a recording method of the present disclosure will be described.

The recording method of the present disclosure includes discharging the ink composition for ink jet textile printing of the present disclosure by an ink jet method and attaching the ink composition for ink jet textile printing to a recording medium.

As a result, a recording method by which a recording section including C.I. Reactive Yellow 2 can be formed, and a recorded material can be stably produced with excellent stability in discharge by an ink jet method and excellent clogging recovery, can be provided.

Particularly, the recording method of the present embodiment includes a discharging step of applying the ink composition for ink jet textile printing of the present disclosure to a recording medium by an ink jet method; and a dyeing treatment step of performing a dyeing treatment of the ink composition for ink jet textile printing applied to the recording medium. Furthermore, in the following description, a case where a fabric is used as a recording medium will be described as a representative example.

3-1. Discharging Step

In the discharging step, the ink composition for ink jet textile printing of the present disclosure is discharged as liquid droplets by an ink jet method, and the liquid droplets are attached to a fabric as a recording medium. As a result, a desired image is formed. For the formation of an image, a plurality of ink compositions for ink jet textile printing, for example, the ink composition for ink jet textile printing of the present disclosure, may be used.

The ink jet method for discharging the ink composition for ink jet textile printing may be any method, and examples thereof include on-demand methods such as a charge deflection method, a continuous method, a piezoelectric method, and a BUBBLE JET (registered trademark) method.

An ink jet device used for discharging the ink composition for ink jet textile printing will be described in detail later.

3-2. Dyeing Treatment Step

In the dyeing treatment step, the color material attached to the fabric, which is the recording medium, is fixed. The dyeing treatment step is usually carried out under high-temperature and humidified conditions.

The treatment temperature for the dyeing treatment step is not particularly limited; however, the treatment temperature is preferably from 90° C. to 150° C., more preferably from 95° C. to 130° C., and even more preferably from 98° C. to 120° C.

As a result, the color material can be more efficiently fixed while more effectively preventing unintentional denaturation, deterioration, and the like of the fabric as the recording medium and the constituent components of the ink composition for ink jet textile printing.

The treatment time for the dyeing treatment step is not particularly limited; however, the treatment time is preferably from 1 minute to 120 minutes, more preferably from 2 minutes to 90 minutes, and even more preferably from 3 minutes to 60 minutes.

As a result, the productivity of the dyed product can be made superior while making the dyeing affinity of the color material to the fabric as the recording medium superior.

For the high-temperature and humidification treatment in the dyeing treatment step, various steamers, for example, a steamer DHe type manufactured by Mathis AG, can be used.

The recording method according to the present disclosure may have a step other than the discharging step and the dyeing treatment step as necessary.

For example, the recording method may have, prior to the discharging step, a pretreatment step of subjecting the fabric as the recording medium to a pretreatment.

For the pretreatment, for example, known pretreatment agents can be used; however, the pretreatment agents generally include a sizing agent, a pH adjusting agent, and a hydrotropy agent.

Regarding the sizing agent, for example, a natural gum, a starch, a seaweed, a plant bark, a cellulose derivative, a processed starch, a processed natural gum, sodium alginate, an alginic acid derivative, a synthetic glue, and an emulsion can be suitably used.

Examples of the natural gum include guar and locust bean. Examples of the seaweed include gloiopeltis. Examples of the plant bark include pectic acid. Examples of the cellulose derivative include methyl cellulose, ethyl cellulose, hydroxyethyl cellulose, and carboxymethyl cellulose. Examples of the processed starch include roasted starch, alpha starch, carboxymethyl starch, carboxyethyl starch, and hydroxyethyl starch. Examples of the processed natural gum include shiratsu gum-based and locust bean gum-based processed natural gums. Examples of the synthetic glue include polyvinyl alcohol and polyacrylic acid ester.

Regarding the pH adjusting agent, for example, an acid ammonium salt such as ammonium sulfate or ammonium tartrate can be suitably used.

Furthermore, as the hydrotropy agent, for example, various ureas, such as urea and alkyl ureas such as dimethylurea, thiourea, monomethylthiourea, and dimethylthiourea, can be used. The pretreatment agent may further include, for example, silica.

Furthermore, for example, after the dyeing treatment step, the recording method may have a washing step of performing a washing treatment on the fabric on which the dyes have been fixed, as necessary.

The washing step can be carried out such that, for example, the fabric having the dyes fixed thereon is washed by rubbing under tap water and then is immersed, while being appropriately stirred, in washing liquid obtained by adding a nonionic soaping agent into warm water at a temperature of from 40° C. to 70° C. The immersion time in the washing liquid can be, for example, from 5 minutes to 60 minutes. After that, the washing agent can be removed by hand-washing while pouring tap water into the washing liquid.

3-3. Fabric

Next, the fabric as a recording medium to which the ink composition for ink jet textile printing is applied will be described.

Regarding the fabric, for example, various woven fabrics such as plain weave, twill weave, sateen weave, modified plain weave, modified twill weave, modified sateen weave, fancy weave, Jacquard weave, single ply weave, backed weave, multiple weave, warp pile weave, weft pile weave, and Leno weave can be used.

Furthermore, the thickness of the fiber constituting the fabric can be adjusted to be, for example, from 10 d to 100 d.

Examples of the fiber constituting the fabric include a polyester fiber, a nylon fiber, a triacetate fiber, a diacetate fiber, a polyamide fiber, a cellulose fiber, and a blend obtained by using two or more these fibers. Furthermore, a blend of these fibers with regenerated fibers such as rayon or natural fibers such as cotton, silk, and wool may also be used; however, it is preferable that the fabric contains cellulose fibers. As a result, the dyeing affinity of the above-mentioned color material can be made superior.

4. Ink Jet Device

As described above, the ink composition for ink jet textile printing of the present disclosure is discharged by an ink jet method.

Hereinafter, an ink jet device according to the present disclosure, that is, an ink jet device used for discharging the ink composition for ink jet textile printing of the present disclosure, will be described.

The ink jet device according to the present disclosure includes an ink jet head that discharges the ink composition for ink jet textile printing of the present disclosure.

It is preferable that the ink jet head uses a piezoelectric oscillator. As a result, denaturation of the color material and the like in the ink jet head can be prevented more effectively, and the stability in discharge by an ink jet method can be made superior.

It is preferable that the ink jet device includes a circulation path for circulating the ink composition for ink jet textile printing in the pressure chamber.

As a result, local drying of the ink in the vicinity of the nozzle can be effectively prevented, and therefore, it is possible to more effectively prevent the solid content of the ink composition for ink jet textile printing from being unintentionally precipitated For such a reason, the stability and the like of the ink composition for ink jet textile printing in discharge by an ink jet method can be made superior.

The ratio of the circulating flow rate of the ink composition for ink jet textile printing with respect to the maximum discharge amount of the ink jet head is not particularly limited; however, the ratio is preferably from 0.05 to 20, more preferably from 0.07 to 15, and even more preferably from 0.10 to 10. As a result, the above-mentioned effect is more notably exhibited.

In the following description, the ink jet device according to the present disclosure will be described in more detail with reference to the accompanying drawings, by way of a first embodiment and a second embodiment, which are suitable embodiments.

4-1. First Embodiment

Figure 2:
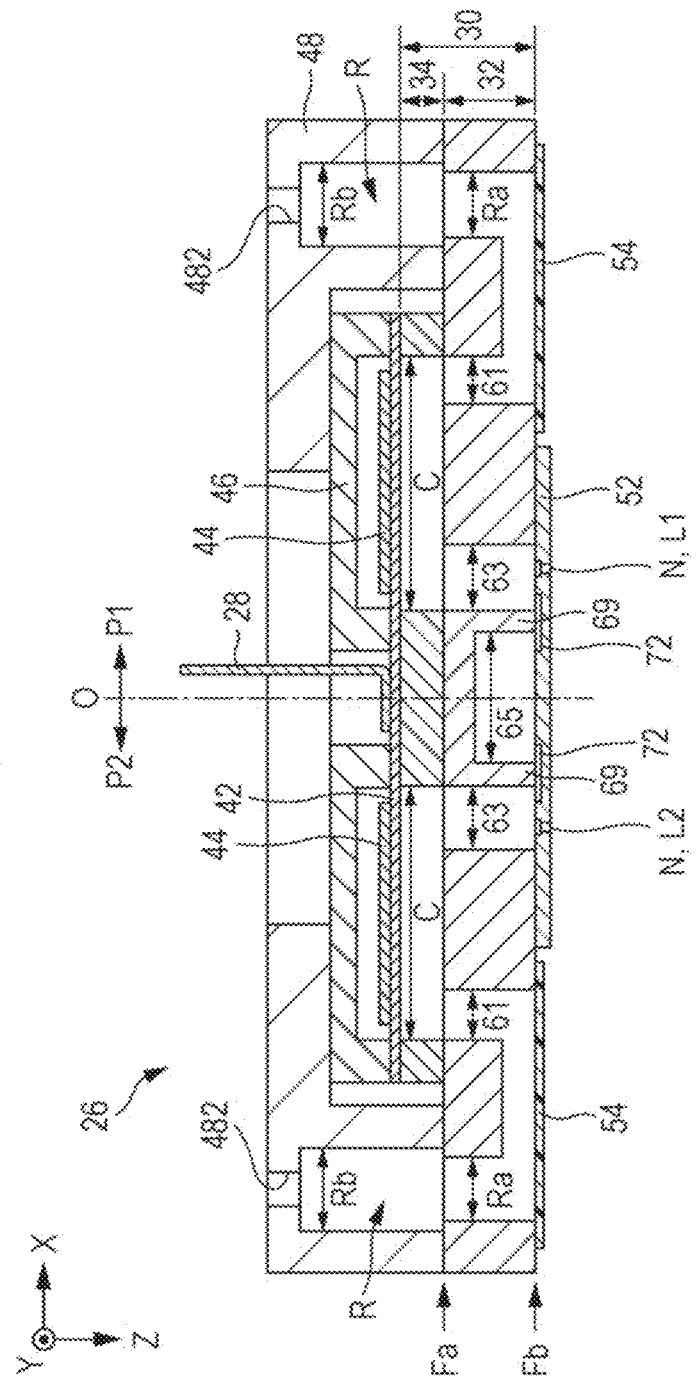
FIG. 2 is a sectional view of an ink jet head included in the ink jet device shown in FIG. 1.
Figure 3:
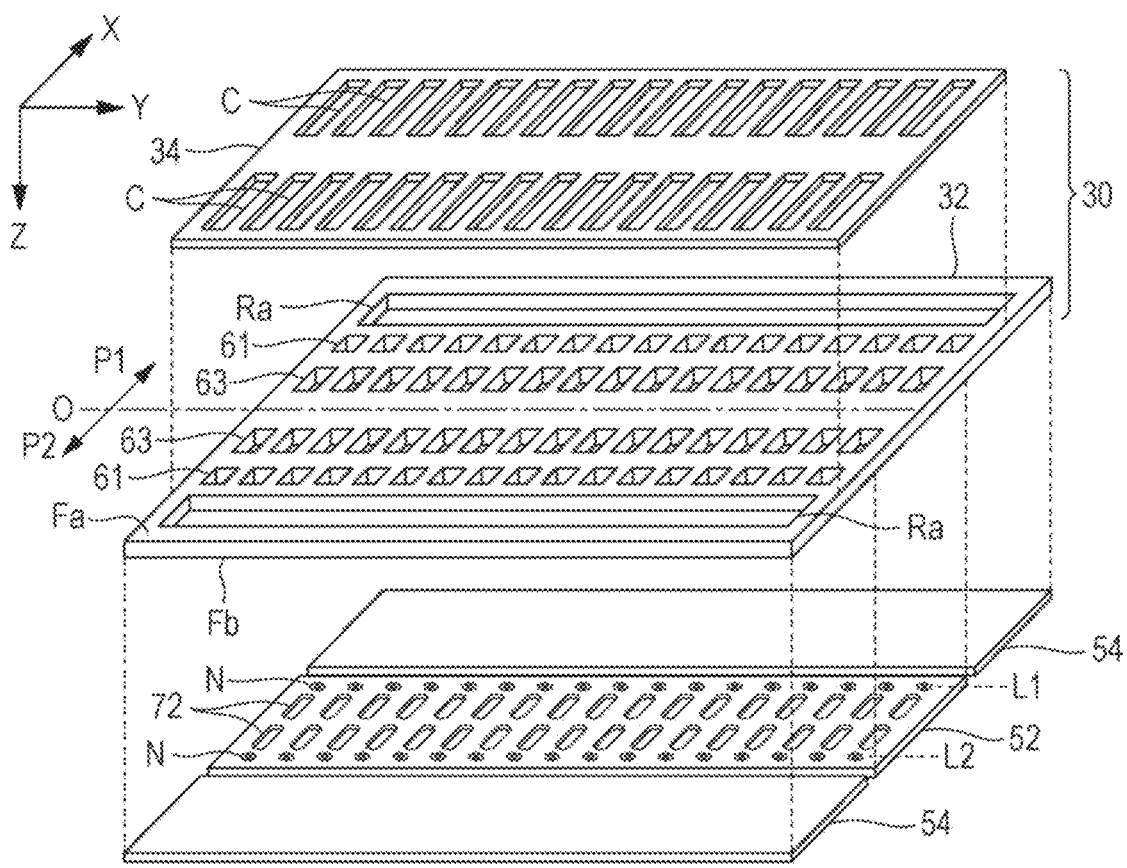
FIG. 3 is a partial exploded perspective view of the ink jet head shown in FIG. 2.
Figure 4:
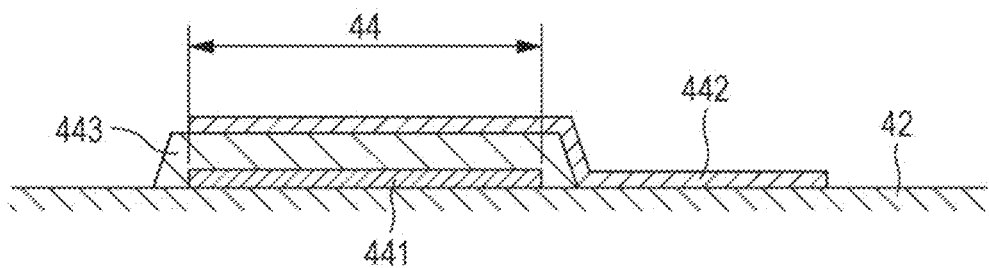
FIG. 4 is a sectional view of a piezoelectric element included in the ink jet head shown in FIG. 2.
Figure 5:
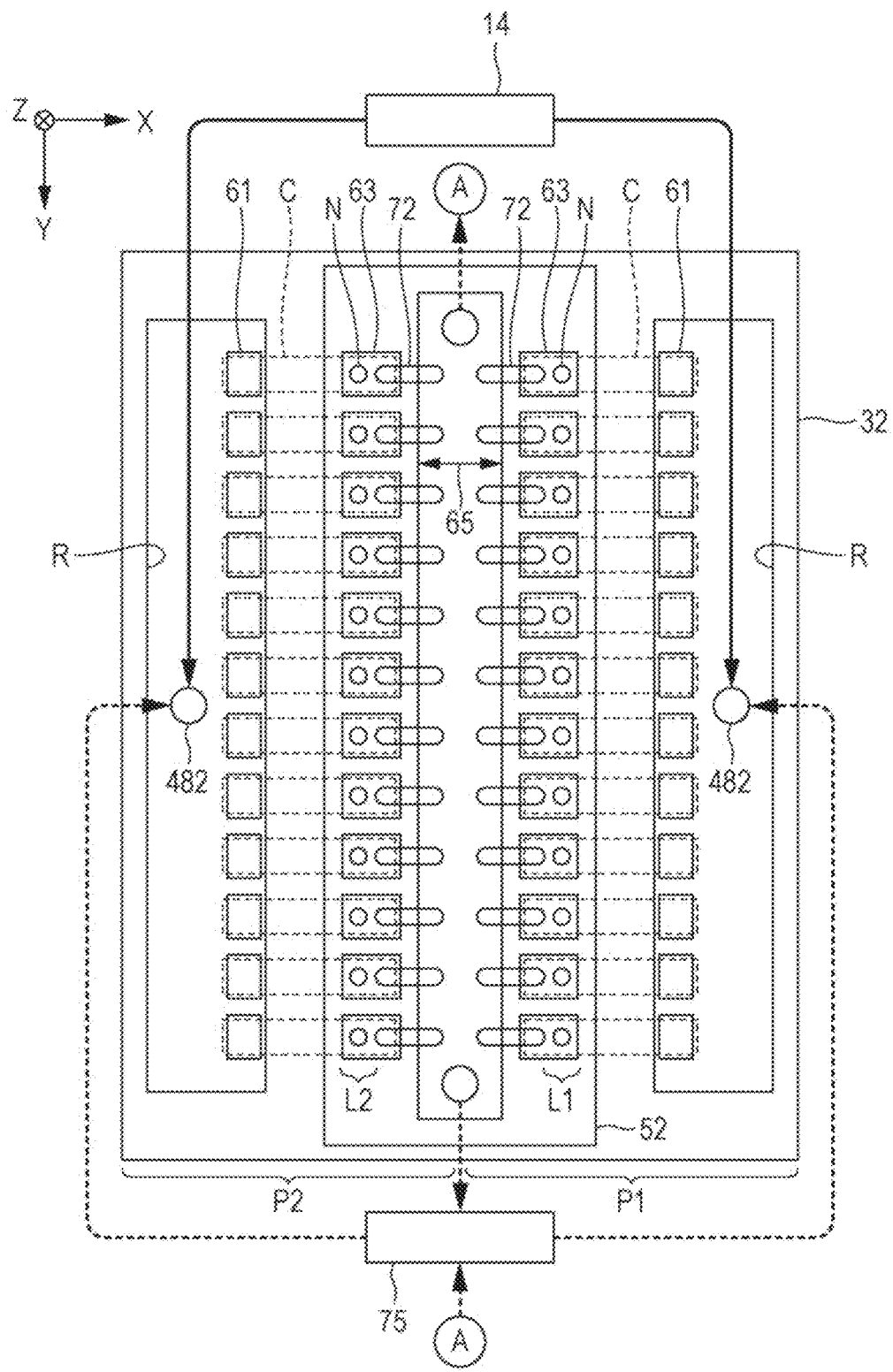
FIG. 5 is an explanatory diagram on the ink circulation in the ink jet head shown in FIG. 2.
Figure 6:
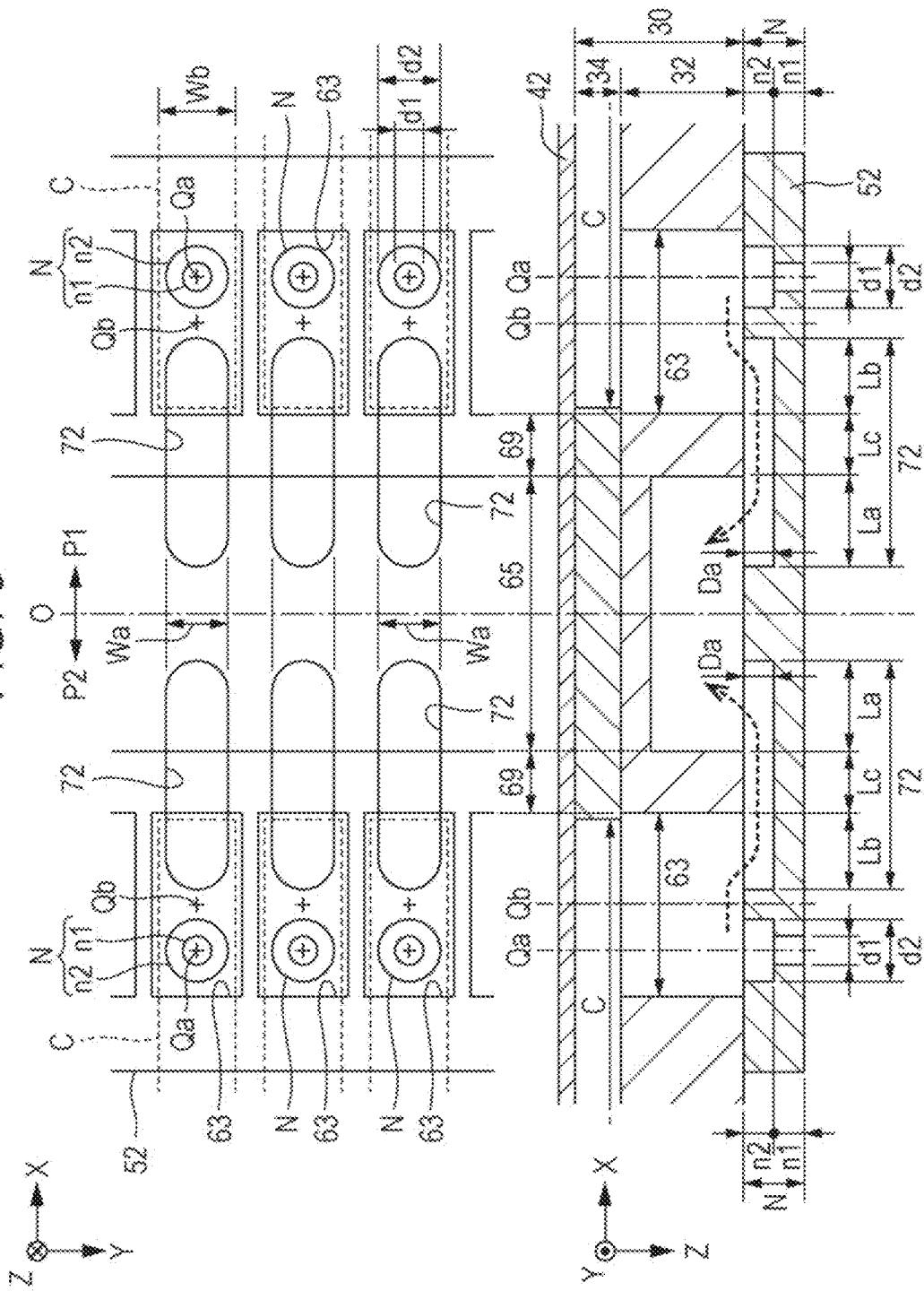
FIG. 6 is a plan view and a sectional view of the vicinity of a circulation ink chamber in the ink jet head shown in FIG. 2.

FIG. 1 is a configuration diagram of an ink jet device of the first embodiment. FIG. 2 is a sectional view of an ink jet head included in the ink jet device shown in FIG. 1. FIG. 3 is a partial exploded perspective view of the ink jet head shown in FIG. 2. FIG. 4 is a sectional view of the piezoelectric element included in the ink jet head shown in FIG. 2. FIG. 5 is an explanatory diagram on the ink circulation in the ink jet head shown in FIG. 2. FIG. 6 is a plan view and a sectional view of the vicinity of a circulation ink chamber in the ink jet head shown in FIG. 2.

The ink jet device 100 of the present embodiment is a printing device for an ink jet method of discharging an ink composition for ink jet textile printing onto a fabric 12 as a recording medium. An ink container 14 that stores an ink composition for ink jet textile printing is installed in the ink jet device 100. For example, a cartridge that is attachable or detachable from the ink jet device 100, a bag-shaped ink pack formed from a flexible film, or an ink tank that can be refilled with an ink composition for ink jet textile printing is utilized as the ink container 14. The ink jet device 100 may include, for example, a plurality of ink containers 14 corresponding to a plurality of ink compositions for ink jet textile printing.

The ink jet device 100 includes a control unit 20, a transport mechanism 22, a moving mechanism 24, and an ink jet head 26. The control unit 20 includes, for example, a processing circuit such as a Central Processing Unit (CPU) or a Field Programmable Gate Array (FPGA); and a storage circuit such as a semiconductor memory, and controls each of the elements of the ink jet device 100 in an integrated manner. The transport mechanism 22 transports the fabric 12 in the Y-direction under the control by the control unit 20.

The moving mechanism 24 reciprocates the ink jet head 26 in the X-direction under the control by the control unit 20. The X-direction is a direction intersecting the Y-direction in which the fabric 12 is transported, and the X-direction is typically a direction that is orthogonal to the Y-direction. The moving mechanism 24 includes a box-shaped transport body 242 that houses the ink jet head 26, and a transport belt 244 to which the transport body 242 is fixed. A configuration in which a plurality of ink jet heads 26 are mounted on the transport body 242, or a configuration in which the ink container 14 is mounted, together with the ink jet head 26, on the transport body 242 may be used.

The ink jet head 26 discharges the ink composition for ink jet textile printing supplied from the ink container 14 through a plurality of nozzles N onto a fabric 12 under the control of the control unit 20. In parallel with the transport of the fabric 12 by the transport mechanism 22 and with the repetitive reciprocation of the transport body 242, each ink jet head 26 discharges the ink composition for ink jet textile printing onto the fabric 12 so that a desired image is formed on the surface of the fabric 12. A direction perpendicular to the X-Y plane will be described as Z-direction in the following description. The direction of discharge of the ink composition for ink jet textile printing by each ink jet head 26, typically the vertical direction, corresponds to the Z-direction.

The nozzles N of the ink jet head 26 are arranged in the Y-direction. The nozzles N are divided into a first row L1 and a second row L2, which are disposed in parallel with each other at an interval in the X-direction. Each of the first row L1 and the second row L2 is a set of a plurality of nozzles N linearly arranged in the Y-direction. It is also possible to make the respective positions of the nozzles N in the Y-direction different between the first row L1 and the second row L2 and to adopt, for example, a zigzag arrangement or a staggered arrangement, and in the following description, a case will be described in which the respective positions of the nozzles N in the Y-direction match between the first row L1 and the second row L2. A plane that passes through the central axis parallel to the Y-direction and is parallel to the Z-direction in the ink jet head 26, that is, the Y-Z plane, is referred to as "center plane O" in the following description.

As shown in FIGS. 2 and 3, the ink jet head 26 has a structure in which the respective elements related to the nozzles N in the first row L1 as a first nozzle and the respective elements related to the nozzles N in the second row L2 as a second nozzle are disposed in plane symmetry, with the center plane O interposed therebetween. That is, the structure is substantially common between a first portion P1, which is a portion in the positive side in the X-direction, and a second portion P2, which is a portion in the negative side in the X-direction, with the center plane O interposed therebetween in the ink jet head 26. The nozzles N in the first row L1 are formed in the first portion P1, and the nozzles N in the second row L2 are formed in the second portion P2. The center plane O corresponds to a boundary plane between the first portion P1 and the second portion P2.

As shown in FIG. 2 and FIG. 3, the ink jet head 26 includes a flow path forming section 30. The flow path forming section 30 is a structure that forms flow paths for supplying an ink composition for ink jet textile printing to the nozzles N. The flow path forming section 30 is configured such that a first flow path substrate 32, which is a communicating plate, and a second flow path substrate 34, which is a pressure chamber forming plate, are laminated. Each of the first flow path substrate 32 and the second flow path substrate 34 is a plate-shaped member elongated in the Y-direction. The second flow path substrate 34 is installed, for example, by utilizing an adhesive, on a surface Fa on the negative side in the Z-direction of the first flow path substrate 32.

As shown in FIG. 2, on the surface Fa of the first flow path substrate 32, a vibrator 42, a plurality of piezoelectric elements 44, a protective member 46, and a housing section 48 are installed in addition to the second flow path substrate 34. On the other hand, a nozzle plate 52 and a vibration absorber 54 are installed on the positive side in the Z-direction in the first flow path substrate 32, that is, on a surface Fb at an opposite side from the surface Fa. Each of the elements of the ink jet head 26 is approximately a plate-shaped member elongated in the Y-direction as is the case of the first flow path substrate 32 and the second flow path substrate 34, and is joined to each other by, for example, an adhesive. The direction in which the first flow path substrate 32 and the second flow path substrate 34 are laminated, or the direction in which the first flow path substrate 32 and the nozzle plate 52 are laminated, can be understood as the Z-direction.

The nozzle plate 52 is a plate-shaped member in which a plurality of nozzles N are formed, and the nozzle plate 52 is installed on the surface Fb of the first flow path substrate 32 by utilizing, for example, an adhesive. Each of the nozzles N is a circular-shaped through-hole, through which the ink composition for ink jet textile printing is passed. In the nozzle plate 52, a plurality of nozzles N constituting the first row L1 and a plurality of nozzles N constituting the second row L2 are formed. Specifically, the nozzles N of the first row L1 are formed along the Y-direction in the nozzle plate 52, in a region on the positive side in the X-direction as viewed from the center plane O, and the nozzles N of the second row L2 are formed along the Y-direction in a region on the negative side in the X-direction. The nozzle plate 52 is a single plate-shaped member that extends continuously over the portion where a plurality of nozzles N of the first row L1 are formed and the portion where a plurality of nozzles N of the second row L2 are formed.

As shown in FIG. 2 and FIG. 3, in the first flow path substrate 32, a space Ra, a plurality of supply paths 61, and a plurality of communicating paths 63 are formed in each of the first portion P1 and the second portion P2. The space Ra is an opening formed into an elongated shape along the Y-direction in plan view, that is, as viewed from the Z-direction, and the supply paths 61 and the communicating paths 63 are through-holes formed in every nozzle N. The communicating paths 63 are arranged in the Y-direction in plan view, and the supply paths 61 are arranged in the Y-direction between the arrangement of the communicating paths 63 and the space Ra. The supply paths 61 communicate in common with the space Ra. Furthermore, any one communicating path 63 overlaps with the nozzle N corresponding to that communicating path 63 in plan view. Specifically, any one communicating path 63 of the first portion P1 communicates with one nozzle N corresponding to that communicating path 63 in the first row L1. Similarly, any one communicating path 63 of the second portion P2 communicates with one nozzle N corresponding to that communicating path 63 in the second row L2.

As shown in FIG. 2 and FIG. 3, the second flow path substrate 34 is a plate-shaped member in which a plurality of pressure chambers C are formed for each of the first portion P1 and the second portion P2. The pressure chambers C are arranged in the Y-direction. Each of the pressure chambers C is a space having an elongated shape along the X-direction in plan view, which is formed for every nozzle N.

As shown in FIG. 2, a vibrator 42 is installed on a surface at an opposite side of the second flow path substrate 34 from the first flow path substrate 32. The vibrator 42 is a plate-shaped member that can vibrate elastically, that is, a vibrating plate. The second flow path substrate 34 and the vibrator 42 can also be formed integrally by selectively removing, in a plate-shaped member having a predetermined plate thickness, a portion in the plate thickness direction corresponding to the pressure chamber C.

As shown in FIG. 2, the surface Fa of the first flow path substrate 32 and the vibrator 42 face each other at a distance on the inner side of each pressure chamber C. The pressure chamber C is a space located between the surface Fa of the first flow path substrate 32 and the vibrator 42 and causes a pressure change in the ink composition for ink jet textile printing filled in the space. Each pressure chamber C is, for example, a space whose longitudinal direction lies in the X-direction, and each pressure chamber C is individually formed for every nozzle N. A plurality of pressure chambers C are arranged in the Y-direction for each of the first row L1 and the second row L2. As shown in FIG. 2 and FIG. 3, the end portion of any one pressure chamber C on the center plane O side overlaps the communicating path 63 in plan view, and the end portion at an opposite side opposite from the center plane O overlaps the supply path 61 in plan view. Therefore, in each of the first portion P1 and the second portion P2, the pressure chamber C communicates with the nozzle N via the communicating path 63 and also communicates with the space Ra via the supply path 61.

As shown in FIG. 2, on a surface of the vibrator 42 at an opposite side from the pressure chamber C, a plurality of piezoelectric elements 44 corresponding to different nozzles N are installed for each of the first portion P1 and the second portion P2. The piezoelectric element 44 is a passive element that is deformed by a supply of a driving signal. The piezoelectric elements 44 are arranged in the Y-direction so as to correspond to the respective pressure chambers C. As shown in FIG. 4, any one piezoelectric element 44 is a laminated body in which a piezoelectric layer 443 is interposed between a first electrode 441 and a second electrode 442, which face each other. One of the first electrode 441 and the second electrode 442 can be used as an electrode extending continuously over a plurality of piezoelectric elements 44, that is, a common electrode. A portion where the first electrode 441, the second electrode 442, and the piezoelectric layer 443 overlap in plan view, functions as the piezoelectric element 44. A portion deformed by a supply of a driving signal, that is, the active portion that causes the vibrator 42 to vibrate, can also be demarcated as the piezoelectric element 44. As such, the ink jet head 26 according to the present embodiment includes a first piezoelectric element and a second piezoelectric element. For example, the first piezoelectric element is a piezoelectric element 44 on one side in the X-direction as viewed from the center plane O, and the second piezoelectric element is a piezoelectric element 44 on the other side in the X-direction as viewed from the center plane O. When the vibrator 42 vibrates in conjunction with the deformation of the piezoelectric element 44, as the pressure in the pressure chamber C fluctuates, the ink composition for ink jet textile printing filled in the pressure chamber C is discharged by passing through the communicating path 63 and the nozzle N.

The protective member 46 is a plate-shaped member for protecting a plurality of piezoelectric elements 44 and is installed on the surface of the vibrator 42. The piezoelectric elements 44 are housed in a recess formed on the surface of the protective member 46 on the vibrator 42 side.

An end portion of the wiring board 28 is joined to the surface at an opposite side of the vibrator 42 from the flow path forming section 30. The wiring board 28 is a flexible mounting component on which is formed a plurality of wirings not shown in the diagram, the wirings electrically coupling the control unit 20 and the ink jet head 26. In the wiring board 28, an end portion extending toward the outside through an opening formed in the protective member 46 and an opening formed in the housing section 48 is coupled to the control unit 20. For example, a flexible wiring board 28 such as a Flexible Printed Circuit (FPC) or a Flexible Flat Cable (FFC) is suitably employed.

The housing section 48 is a case for storing the ink composition for ink jet textile printing that is supplied to a plurality of pressure chambers C. The surface of the housing section 48 on the positive side in the Z-direction is joined to the surface Fa of the first flow path substrate 32 with, for example, an adhesive.

As shown in FIG. 2, a space Rb is formed in the housing section 48 for each of the first portion P1 and the second portion P2. The space Rb of the housing section 48 and the space Ra of the first flow path substrate 32 communicate with each other. The space composed of the space Ra and the space Rb functions as an ink storage chamber R that stores the ink composition for ink jet textile printing supplied to a plurality of pressure chambers C. The ink storage chamber R is a common ink chamber shared by a plurality of nozzles N. An ink storage chamber R is formed in each of the first portion P1 and the second portion P2. The ink storage chamber R of the first portion P1 is located on the positive side in the X-direction as viewed from the center plane O, and the ink storage chamber R of the second portion P2 is located on the negative side in the X-direction as viewed from the center plane O. An inlet port 482 for introducing the ink composition for ink jet textile printing supplied from the ink container 14 into the ink storage chamber R is formed on the surface of the housing section 48 at an opposite side from the first flow path substrate 32.

As shown in FIG. 2, a vibration absorber 54 is installed on the surface Fb of the first flow path substrate 32 for each of the first portion P1 and the second portion P2. The vibration absorber 54 is a flexible film that absorbs pressure fluctuations in the ink composition for ink jet textile printing inside the ink storage chamber R. As shown in FIG. 3, the vibration absorber 54 is installed on the surface Fb of the first flow path substrate 32 so as to block the space Ra of the first flow path substrate 32 and a plurality of supply paths 61, and constitutes the wall surface of the ink storage chamber R.

As shown in FIG. 2, a circulation ink chamber 65 is formed on the surface Fb of the first flow path substrate 32, the surface Fb facing the nozzle plate 52. The circulation ink chamber 65 is a bottomed hole having an elongated shape and extending in the Y-direction in plan view. The opening of the circulation ink chamber 65 is closed by the nozzle plate 52 joined to the surface Fb of the first flow path substrate 32.

As shown in FIG. 5, the circulation ink chamber 65 extends continuously over a plurality of nozzles N along the first row L1 and the second row L2. Specifically, the circulation ink chamber 65 is formed between the arrangement of the nozzles N in the first row L1 and the arrangement of the nozzles N in the second row L2. Therefore, as shown in FIG. 2, the circulation ink chamber 65 is located between the communicating path 63 of the first portion P1 and the communicating path 63 of the second portion P2. As described above, the flow path forming section 30 of the present embodiment is a structure in which are formed a first communicating path including the first pressure chamber, which is the pressure chamber C in the first portion P1, and the communicating path 63; a second communicating path including the second pressure chamber, which is the pressure chamber C in the second portion P2, and the communicating path 63; and the circulation ink chamber 65 located between the communicating path 63 of the first portion P1 and the communicating path 63 of the second portion P2. As shown in FIG. 2, the flow path forming section 30 of the first embodiment includes a partition wall section 69 that partitions the circulation ink chamber 65 from each of the communicating paths 63.

As described above, a plurality of the pressure chambers C and a plurality of the piezoelectric elements 44 are arranged in the Y-direction in each of the first portion P1 and the second portion P2. Therefore, it can be paraphrased that the circulation ink chamber 65 extends in the Y-direction so as to be continuous over a plurality of the pressure chambers C or a plurality of the piezoelectric elements 44 in each of the first portion P1 and the second portion P2. Furthermore, as shown in FIG. 2 and FIG. 5, it is also possibly configured that the circulation ink chamber 65 and the ink storage chamber R extend in the Y-direction at a distance from each other, and a pressure chamber C, a communicating path 63, and a nozzle N are located within the distance.

As shown in FIG. 6, one nozzle N includes a first segment n1 and a second segment n2. The first segment n1 and the second segment n2 are circular spaces that are coaxially formed and communicate with each other. The second segment n2 is located on the flow path forming section 30 side as viewed from the first segment n1. The inner diameter d2 of the second segment n2 is larger than the inner diameter d1 of the first segment n1. According to the configuration in which each nozzle N is formed in a stepwise manner as described above, there is an advantage that the flow path resistance of each nozzle N can be easily set to have desired characteristics. Furthermore, as shown in FIG. 6, the central axis Qa of each nozzle N is located on the opposite side of the circulation ink chamber 65 when viewed from the central axis Qb of the communicating path 63.

On the surface of the nozzle plate 52 facing the flow path forming section 30, a plurality of circulation paths 72 are formed for each of the first portion P1 and the second portion P2. A plurality of the circulation paths 72 of the first portion P1, which constitutes the first circulation path, correspond on a one-to-one basis to a plurality of the nozzles N of the first row L1. Furthermore, a plurality of the circulation paths 72 of the second portion P2, which constitute the second circulation path, correspond on a one-to-one basis to a plurality of the nozzles N of the second row L2.

Each of the circulation paths 72 is a bottomed hole having an elongated shape extending in the X-direction, and functions as a flow path for circulating the ink composition for ink jet textile printing. The circulation paths 72 are formed at positions separated apart from the nozzles N, specifically, on the circulation ink chamber 65 side when viewed from the nozzles N corresponding to the circulation paths 72.

As shown in FIG. 6, each circulation path 72 is formed linearly in the nozzle N at a flow path width Wa, which is equivalent to the inner diameter d2 of the second segment n2. The flow path width Wa, which is the dimension of the circulation path 72 in the Y-direction, is smaller than a flow path width Wb, which is the dimension of the pressure chamber C in the Y-direction. Therefore, the flow path resistance of the circulation path 72 can be increased as compared with the configuration in which the flow path width Wa of the circulation path 72 is larger than the flow path width Wb of the pressure chamber C. On the other hand, the depth Da of the circulation path 72 with respect to the surface of the nozzle plate 52 is constant over the entire length. Specifically, each circulation path 72 is formed to have a depth equivalent to that of the second segment n2 of the nozzle N. According to the above-described configuration, there is an advantage that the circulation path 72 and the second segment n2 can be easily formed as compared with the configuration in which the circulation path 72 and the second segment n2 are formed at different depths. The "depth" of the flow path means the depth of the flow path in the Z-direction.

Any one circulation path 72 in the first portion P1 is located on the circulation ink chamber 65 side of the first row L1 as viewed from the nozzle N corresponding to that circulation path 72. Furthermore, any one circulation path 72 in the second portion P2 is located on the circulation ink chamber 65 side of the second row L2 as viewed from the nozzle N corresponding to that circulation path 72. The end portion of each circulation path 72 at an opposite side from the center plane O, that is, on the communicating path 63 side, overlaps one communicating path 63 corresponding to that circulation path 72 in plan view. That is, the circulation path 72 communicates with the communicating path 63. On the other hand, the end portion of each circulation path 72 on the center plane O side, that is, on the circulation ink chamber 65 side, overlaps the circulation ink chamber 65 in plan view. That is, the circulation path 72 communicates with the circulation ink chamber 65. As described above, each of a plurality of the communicating paths 63 communicates with the circulation ink chamber 65 via the circulation path 72. Therefore, as shown by the broken line arrow in FIG. 6, the ink composition for ink jet textile printing in each communicating path 63 is supplied to the circulation ink chamber 65 via the circulation path 72. That is, a plurality of communicating paths 63 corresponding to the first row L1 and a plurality of communicating paths 63 corresponding to the second row L2 communicate in common with one circulation ink chamber 65.

FIG. 6 shows the flow path length La of the portion of any one circulation path 72 overlapping the circulation ink chamber 65, the flow path length Lb of the portion of the circulation path 72 overlapping the communicating path 63, and the flow path length Lc of the portion of the circulation path 72 overlapping the partition wall section 69 of the flow path forming section 30. The flow path length Lc corresponds to the thickness of the partition wall section 69. The partition wall section 69 functions as a throttle portion of the circulation path 72. Therefore, as the flow path length Lc corresponding to the thickness of the partition wall section 69 is longer, the flow path resistance of the circulation path 72 increases. In the present embodiment, established is the relationship that the flow path length La is longer than the flow path length Lb, and that the flow path length La is longer than the flow path length Lc. Furthermore, in the present embodiment, the relationship that the flow path length Lb is longer than the flow path length Lc, is established. According to the above-described configuration, there is an advantage that as compared with the configuration in which the flow path length La and the flow path length Lb are shorter than the flow path length Lc, the ink composition for ink jet textile printing can easily flow from the communicating path 63 to the circulation ink chamber 65 via the circulation path 72.

As described above, in the present embodiment, the pressure chamber C indirectly communicates with the circulation ink chamber 65 via the communicating path 63 and the circulation path 72. That is, the pressure chamber C and the circulation ink chamber 65 do not directly communicate with each other. In the above-described configuration, when the pressure in the pressure chamber C fluctuates due to the operation of the piezoelectric element 44, a portion of the ink composition for ink jet textile printing flowing in the communicating path 63 is discharged through the nozzle N to the outside, while a portion of the remaining ink composition for ink jet textile printing flows from the communicating path 63 into the circulation ink chamber 65 via the circulation path 72. In the present embodiment, inertance between the communicating path 63, the nozzle N, and the circulation path 72 is selected such that with regard to the ink composition for ink jet textile printing flowing through the communicating path 63 by one-time driving of the piezoelectric element 44, the discharge amount, which is the amount of the ink composition for ink jet textile printing discharged through the nozzle N, is larger than the circulation amount, which is the amount of the ink composition for ink jet textile printing flowing into the circulation ink chamber 65 through the circulation path 72 in the ink composition for ink jet textile printing flowing through the communicating path 63. Assuming that all the piezoelectric elements 44 are driven all at once, it can be said that the sum of the circulation amounts flowing from a plurality of communicating paths 63 into the circulation ink chamber 65 is larger than the sum of the discharge amounts passed through a plurality of nozzles N.

Specifically, the flow path resistance of each of the communicating path 63, the nozzle N, and the circulation path 72 is determined such that, for example, the ratio of the circulation amount in the ink composition for ink jet textile printing flowing through the communicating path 63 is 70% or more, that is, the ratio of the discharge amount is 30% or less. According to the above-described configuration, it is possible to effectively circulate the ink composition for ink jet textile printing in the vicinity of the nozzle N to the circulation ink chamber 65 while securing the discharge amount of the ink composition for ink jet textile printing. Generally, there is a tendency that when the flow path resistance of the circulation path 72 is larger, the discharge amount increases while the circulation amount decreases, and when the flow path resistance of the circulation path 72 is smaller, the discharge amount decreases while the circulation amount increases.

As shown in FIG. 5, the ink jet device 100 includes a circulation mechanism 75. The circulation mechanism 75 is a mechanism for supplying, that is, circulating, the ink composition for ink jet textile printing in the circulation ink chamber 65 to the ink storage chamber R. Although not shown in the diagram, the circulation mechanism 75 includes, for example, a suction mechanism such as a pump, which suctions the ink composition for ink jet textile printing from the circulation ink chamber 65, a filter mechanism that collects air bubbles and foreign materials mixed in the ink composition for ink jet textile printing, and a heating mechanism that reduces thickening, caused by heating, of the ink composition for ink jet textile printing. The ink composition for ink jet textile printing, in which air bubbles and foreign materials have been removed and thickening has been reduced by the circulation mechanism 75, is supplied from the circulation mechanism 75 to the ink storage chamber R through the inlet port 482. As described above, the ink composition for ink jet textile printing circulates in the course of ink storage chamber R→supply path 61→pressure chamber C→communicating path 63→circulation path 72→circulation ink chamber 65→circulation mechanism 75→ink storage chamber R.

As shown in FIG. 5, the circulation mechanism 75 suctions the ink composition for ink jet textile printing from both sides of the circulation ink chamber 65 in the Y-direction. That is, the circulation mechanism 75 suctions the ink composition for ink jet textile printing from the vicinity of the end portion of the circulation ink chamber 65 on the negative side in the Y-direction and from the vicinity of the end portion of the circulation ink chamber 65 on the positive side in the Y-direction. In the configuration in which the ink composition for ink jet textile printing is suctioned through only one end portion of the circulation ink chamber 65 in the Y-direction, there occurs a difference in the pressure of the ink composition for ink jet textile printing between the two end portions of the circulation ink chamber 65, and due to the pressure difference in the circulation ink chamber 65, the pressure of the ink composition for ink jet textile printing in the communicating path 63 may vary depending on the position in the Y-direction. Therefore, there is a possibility that the characteristics of discharge of the ink composition for ink jet textile printing through each nozzle N, for example, the discharge amount and the discharge speed, may vary depending on the position in the Y-direction. In contrast to the above-described configuration, in the present embodiment, since the ink composition for ink jet textile printing is suctioned through both sides of the circulation ink chamber 65, the pressure difference inside the circulation ink chamber 65 is reduced. Therefore, it is possible to approximate the discharge characteristics of the ink composition for ink jet textile printing with high accuracy over a plurality of nozzles N arranged in the Y-direction. However, when the pressure difference in the Y-direction in the circulation ink chamber 65 does not pose a particular problem, a configuration in which the ink composition for ink jet textile printing is suctioned through one end portion of the circulation ink chamber 65 may be adopted.

As described above, the ink jet device 100 of the present embodiment includes a nozzle plate 52 provided with a first nozzle and a second nozzle; a first pressure chamber and a second pressure chamber, to which the ink composition for ink jet textile printing is supplied; a first communicating path that allows the first nozzle and the first pressure chamber to communicate with each other; a second communicating path that allows the second nozzle and the second pressure chamber to communicate with each other; a flow path forming section 30 provided with a circulation ink chamber 65 that is located between the first communicating path and the second communicating path; and an ink jet head 26 having a pressure generating section that generates a pressure change in each of the first pressure chamber and the second pressure chamber. The nozzle plate 52 is provided with a first circulation path that allows the first communicating path and the circulation ink chamber 65 to communicate with each other, and a second circulation path that allows the second communicating path and the circulation ink chamber to communicate with each other.

4-2. Second Embodiment

Figure 7:
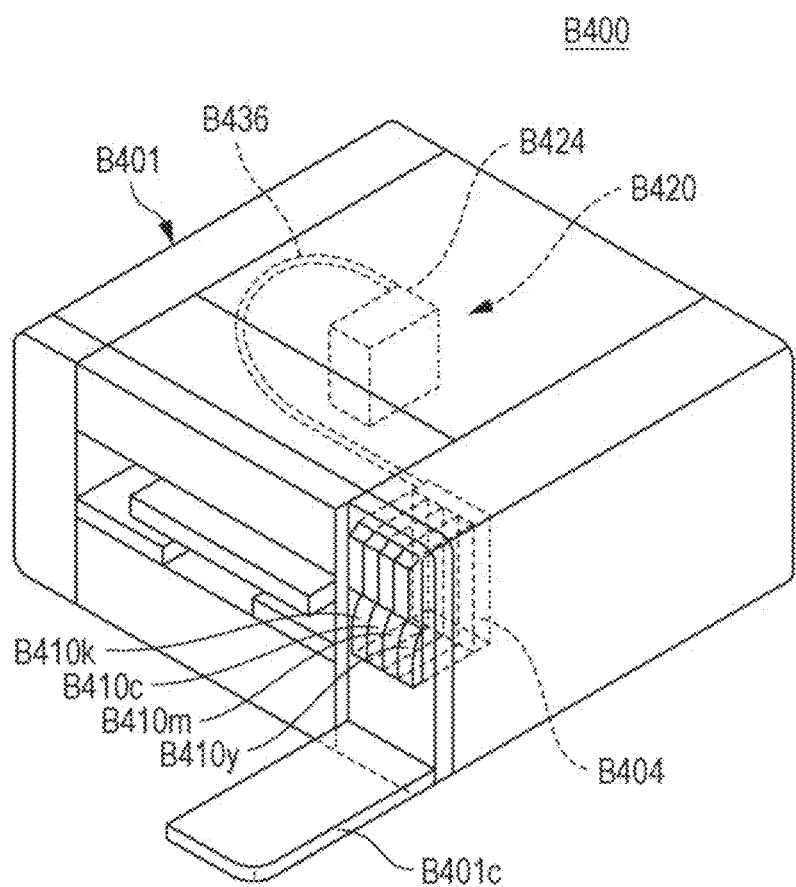
FIG. 7 is a perspective view of an ink jet device according to a second embodiment.
Figure 8:
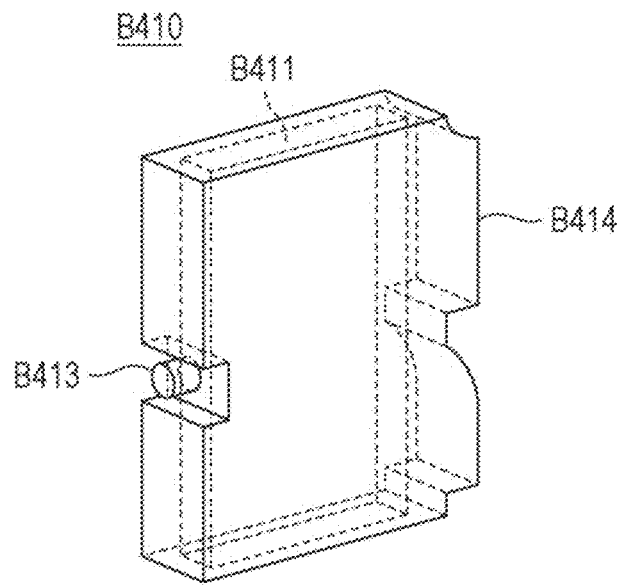
FIG. 8 is a perspective view of a main tank included in the ink jet device shown in FIG. 7.
Figure 9:
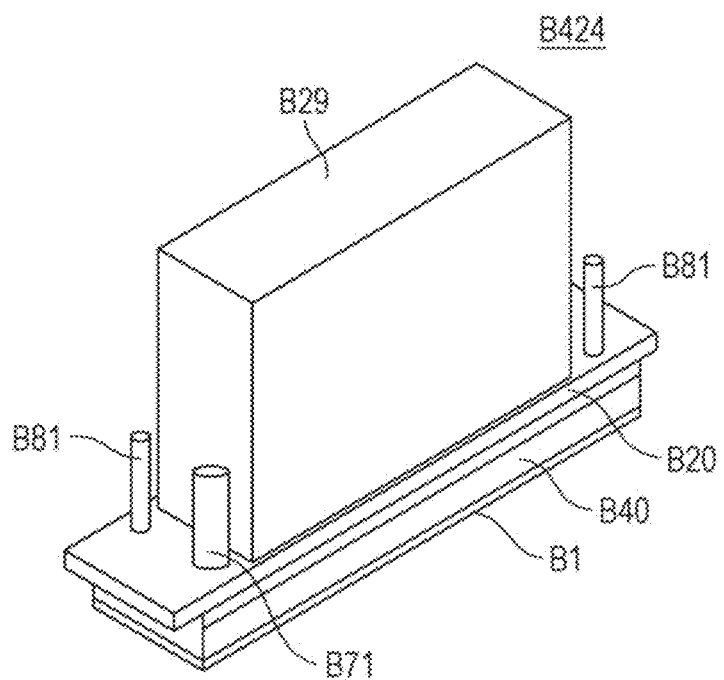
FIG. 9 is a perspective view of the external appearance of an ink jet head included in the ink jet device shown in FIG. 7.
Figure 10:
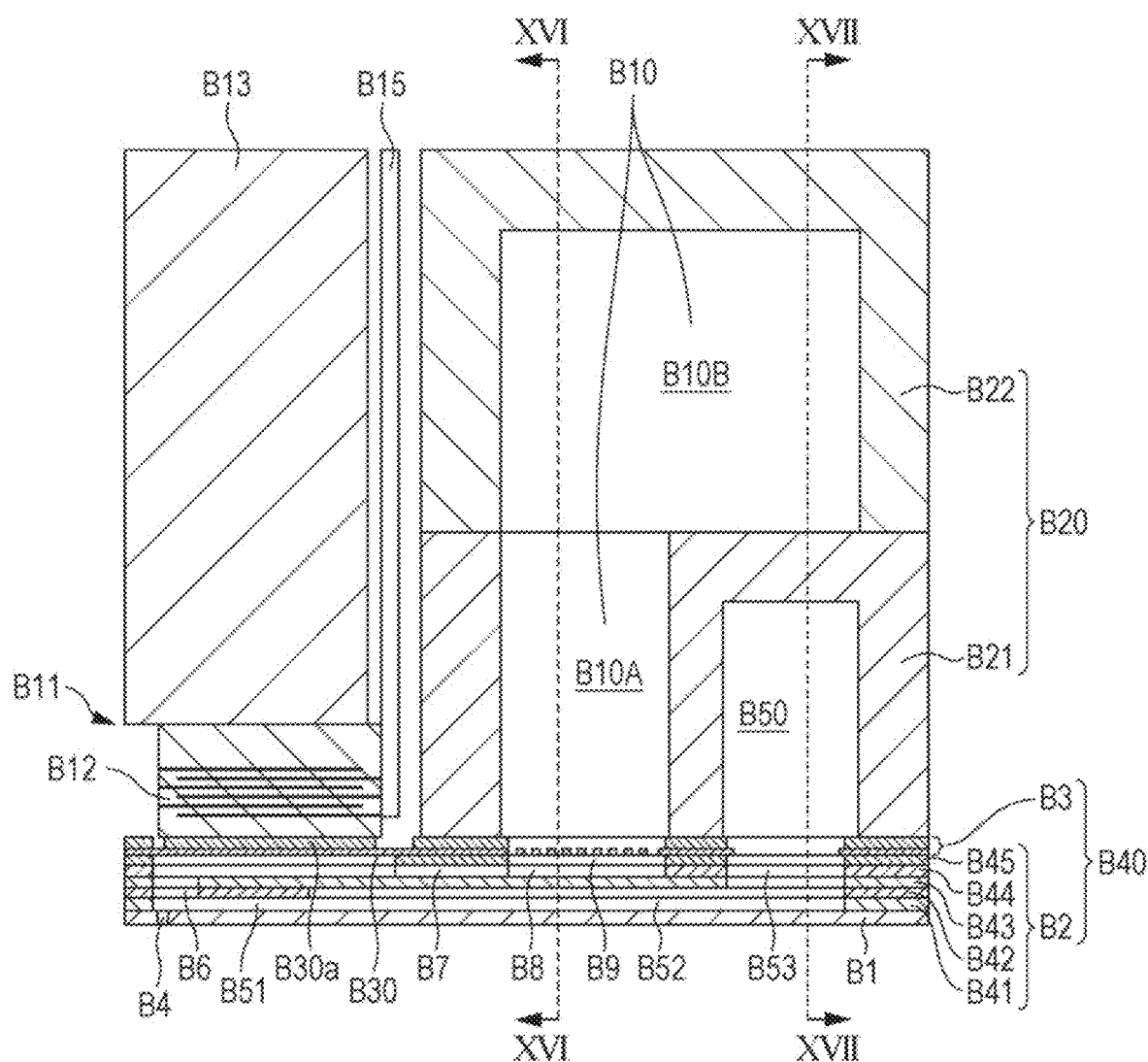
FIG. 10 is a sectional view of the ink jet head shown in FIG. 9 in a direction orthogonal to the direction of nozzle arrangement.
Figure 11:
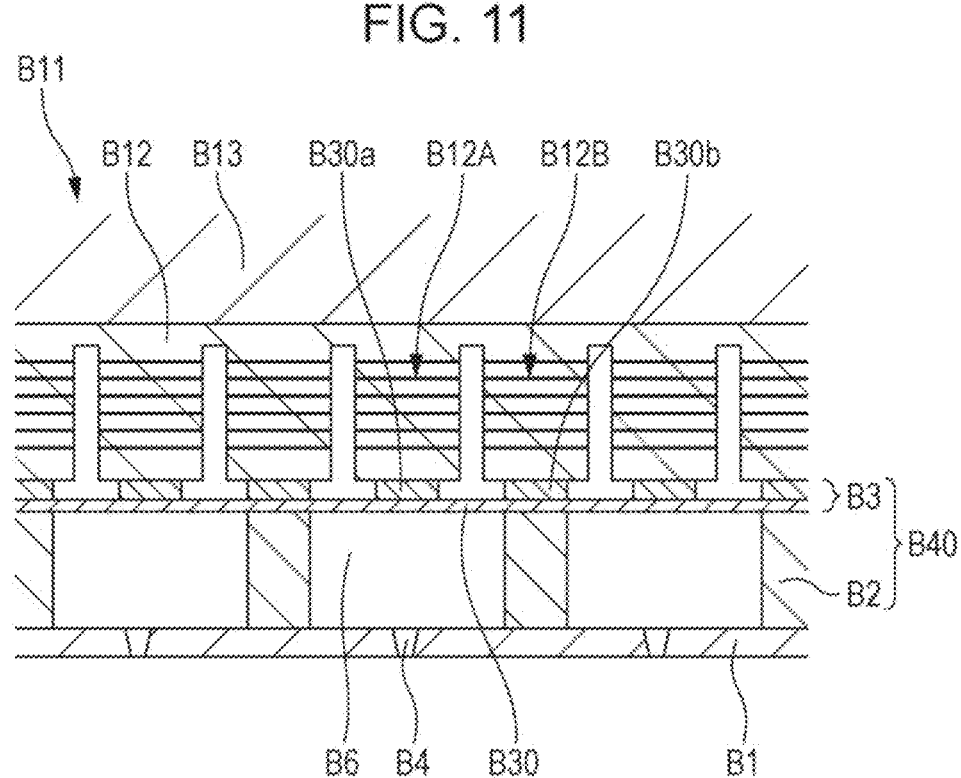
FIG. 11 is a sectional view of the ink jet head shown in FIG. 9 in a direction parallel to the direction of nozzle arrangement.
Figure 12:
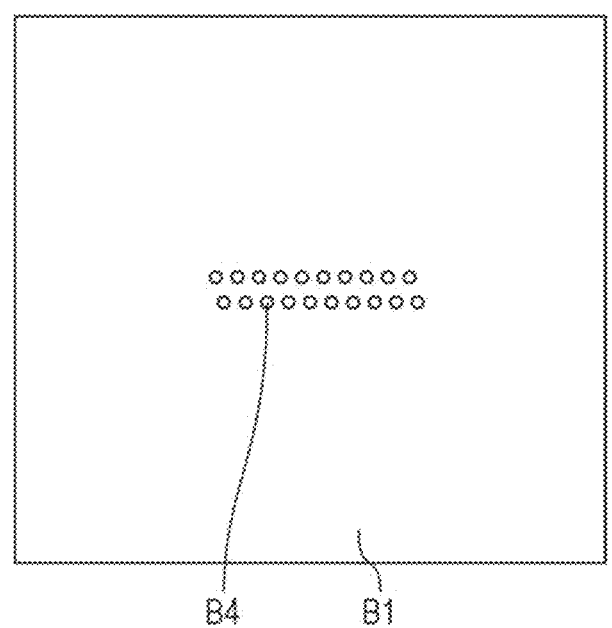
FIG. 12 is a plan view of a nozzle plate of the ink jet head shown in FIG. 9.
Figure 16:
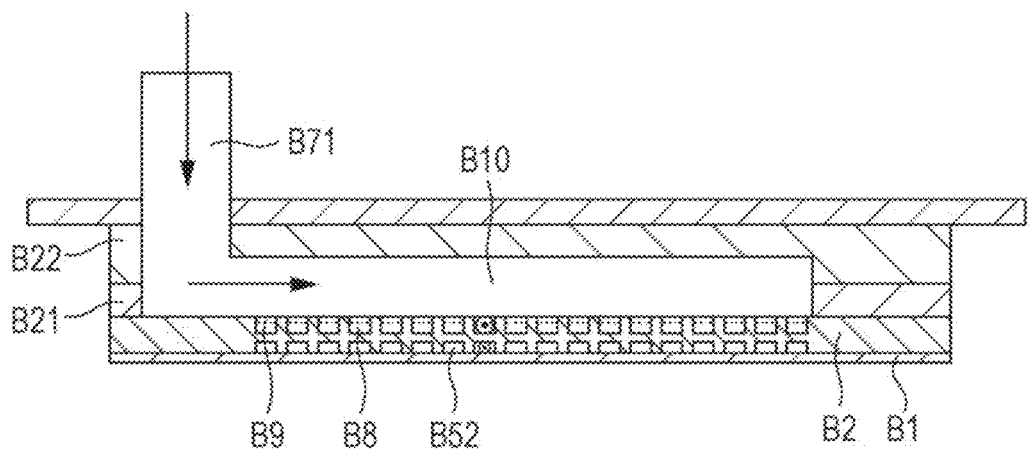
FIG. 16 is a sectional view taken along the line XVI-XVI in FIG. 10.
Figure 17:
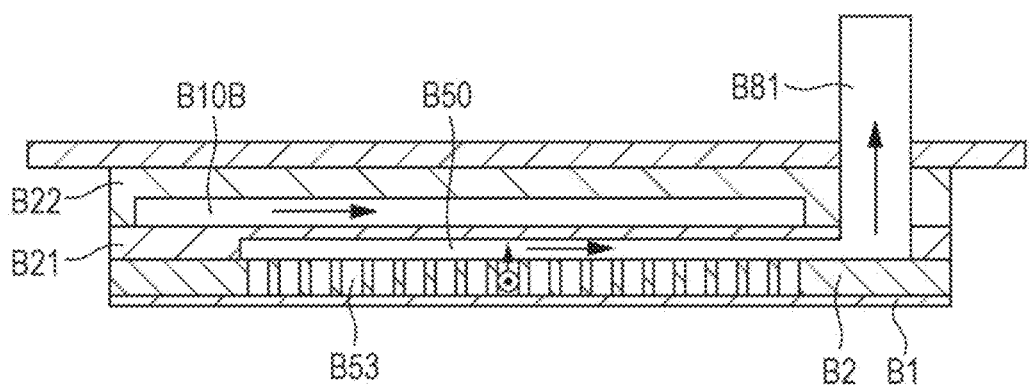
FIG. 17 is a sectional view taken along the line XVII-XVII in FIG. 10.

FIG. 7 is a perspective view of an ink jet device of a second embodiment. FIG. 8 is a perspective view of a main tank included in the ink jet device shown in FIG. 7. FIG. 9 is a perspective view of the external appearance of an ink jet head included in the ink jet device shown in FIG. 7. FIG. 10 is a sectional view of the ink jet head shown in FIG. 9 in a direction orthogonal to the direction of nozzle arrangement. FIG. 11 is a sectional view of the ink jet head shown in FIG. 9 in a direction parallel to the direction of nozzle arrangement. FIG. 12 is a plan view of the nozzle plate of the ink jet head shown in FIG. 9. FIG. 13A to FIG. 13F are plan views of each member constituting the flow path member of the ink jet head shown in FIG. 9. FIG. 14A and FIG. 14B are plan views of each member constituting the common ink chamber member of the ink jet head shown in FIG. 9. FIG. 15 is a block diagram showing an example of an ink circulation system in the ink jet device of the second embodiment. FIG. 16 is a sectional view taken along the line XVI-XVI in FIG. 10. FIG. 17 is a sectional view taken along the line XVII-XVII in FIG. 10.

A mechanical section B420 is provided in the outer packaging B401 of the ink jet device B400. Each of the ink accommodating sections B411 of a main tank B410k, a main tank B410c, a main tank B410m, and a main tank B410y, which are the main tanks B410 for the colors of black, cyan, magenta, and yellow, respectively, is formed from, for example, a packaging member such as an aluminum laminate film. The ink accommodating sections B411 are housed in, for example, a plastic accommodating container case B414. As a result, the main tanks B410 are used as ink cartridges for the respective colors.

On the other hand, a cartridge holder B404 is provided on the inner side of the opening when a cover B401c of the main body of the device is opened. The main tanks B410 are attachably and detachably fitted to the cartridge holder B404. As a result, each of ink discharge ports B413 of the main tanks B410 and an ink jet head B424 for each color communicate with each other via a supply tube B436 for each color, and an ink composition for ink jet textile printing can be discharged from the ink jet head B424 toward a fabric as a recording medium.

The ink jet head B424 has a nozzle plate B1, a flow path plate B2, and a vibrating plate member B3 as a wall surface member laminated and joined therein. Further, the ink jet head B424 includes a piezoelectric actuator B11 that displaces the vibrating plate member B3, a common ink chamber member B20, and a cover B29. The nozzle plate B1 has a plurality of nozzles B4 that discharge an ink composition for ink jet textile printing.

The flow path plate B2 forms individual ink chambers B6 communicating with the nozzle B4, a fluid resistance section B7 communicating with the individual ink chambers B6, and an ink inlet section B8 communicating with the fluid resistance section B7. Furthermore, the flow path plate B2 is formed by laminating and joining a plurality of plate-shaped members B41, B42, B43, B44, and B45 from the nozzle plate B1 side, and these plate-shaped members B41, B42, B43, B44, and B45 and the vibrating plate member B3 are laminated and joined to constitute a flow path member B40.

The vibrating plate member B3 has a filter section B9 as an opening that communicates with the ink inlet section B8 and the common ink chamber B10 formed by the common ink chamber member B20.

The vibrating plate member B3 is a wall surface member that forms the wall surface of the individual ink chambers B6 of the flow path plate B2. This vibrating plate member B3 has a two-layer structure and is formed of a first layer that forms a thin portion and a second layer that forms a thick portion, from the flow path plate B2 side, and a deformable vibration region B30 is formed in the portion corresponding to the individual ink chamber B6 at the first layer.

Here, as shown in FIG. 12, a plurality of nozzles B4 are disposed in a zigzag pattern in the nozzle plate B1.

Figure 13A:
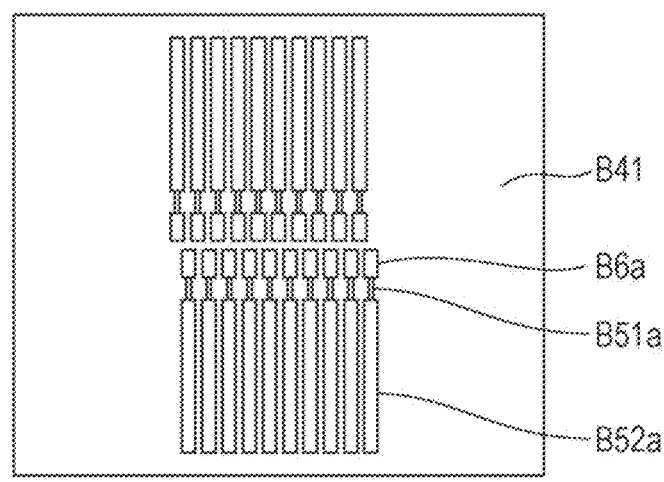
FIG. 13A is a plan view of each member constituting a flow path member of the ink jet head shown in FIG. 9.
Figure 14A:
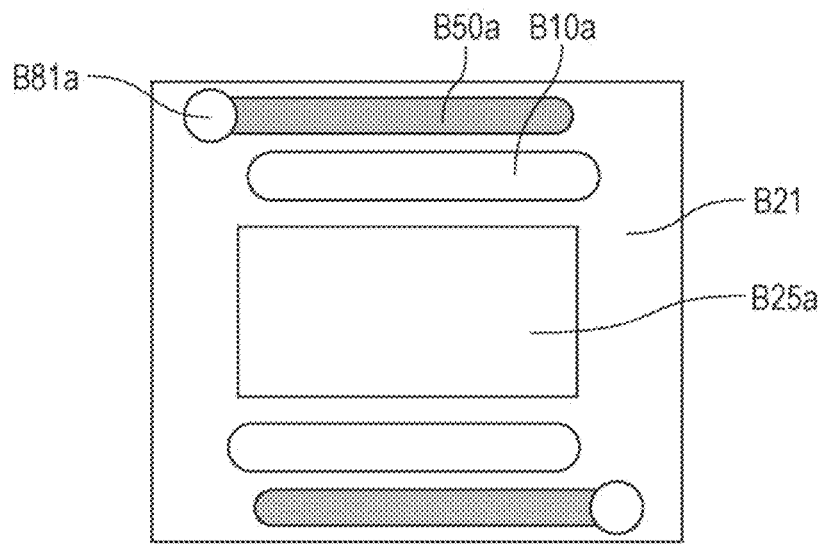
FIG. 14A is a plan view of each member constituting a common ink chamber member of the ink jet head shown in FIG. 9.
Figure 14B:
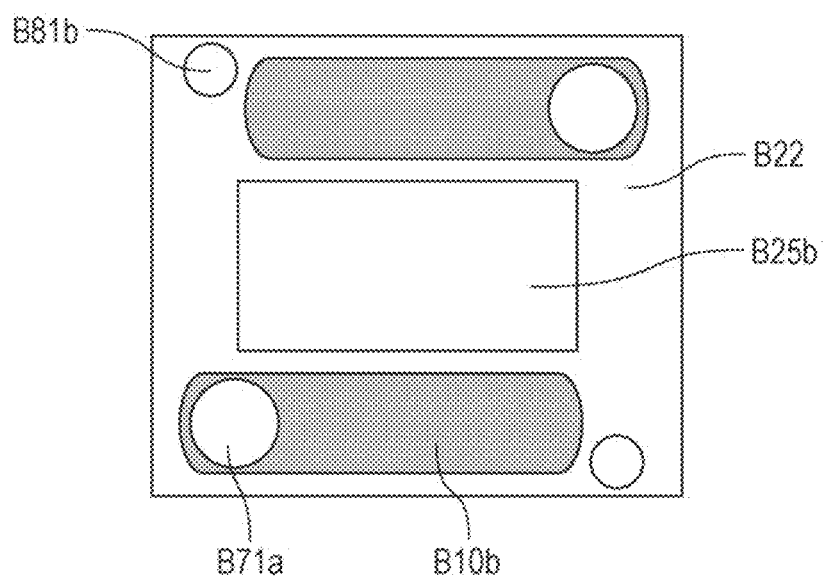
FIG. 14B is a plan view of each member constituting the common ink chamber member of the ink jet head shown in FIG. 9.

As shown in FIG. 13A, the plate-shaped member B41 constituting the flow path plate B2 has formed therein a through-groove section B6a constituting the individual ink chamber B6, and through-groove sections B51a and B52a constituting the fluid resistance section B51 and the circulation path B52.

Figure 13B:
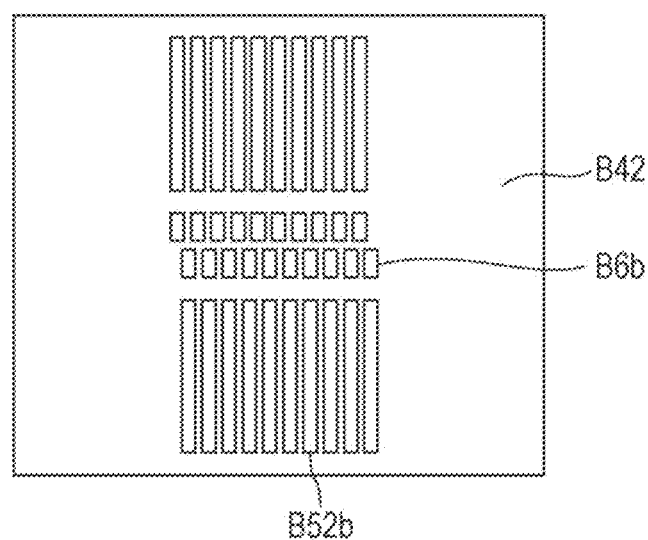
FIG. 13B is a plan view of each member constituting the flow path member of the ink jet head shown in FIG. 9.

As shown in FIG. 13B, the same plate-shaped member B42 has formed therein a through-groove section B6b constituting the individual ink chamber B6, and a through-groove section B52b constituting the circulation path B52.

Figure 13C:
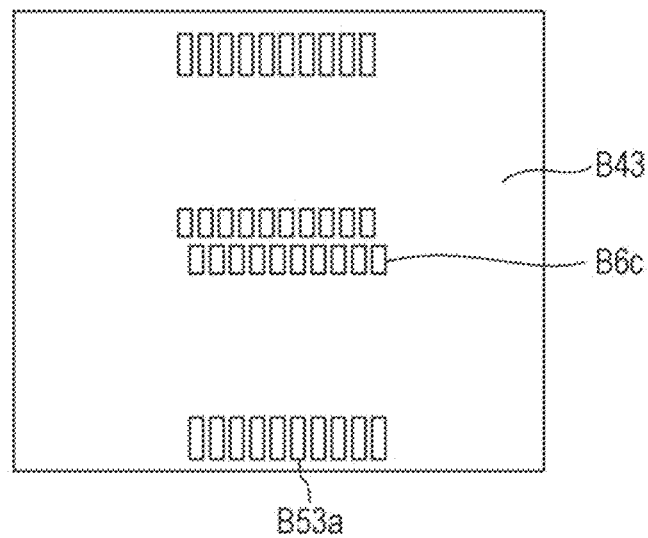
FIG. 13C is a plan view of each member constituting the flow path member of the ink jet head shown in FIG. 9.

As shown in FIG. 13C, the same plate-shaped member B43 has formed in a through-groove section B6c constituting the individual ink chamber B6, and a through-groove section B53a in which the direction of the nozzle arrangement constituting the circulation path B53 is the longitudinal direction.

Figure 13D:
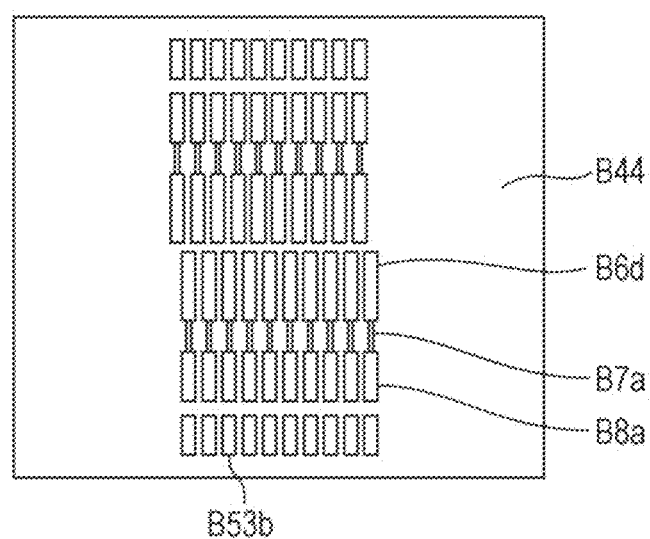
FIG. 13D is a plan view of each member constituting the flow path member of the ink jet head shown in FIG. 9.

As shown in FIG. 13D, the same plate-shaped member B44 has formed therein a through-groove section B6d constituting the individual ink chamber B6, a through-groove section B7a forming the fluid resistance section B7, a through-groove section B8a constituting the ink inlet section B8, and a through-groove section B53b in which the direction of the nozzle arrangement constituting the circulation path B53 is the longitudinal direction.

Figure 13E:
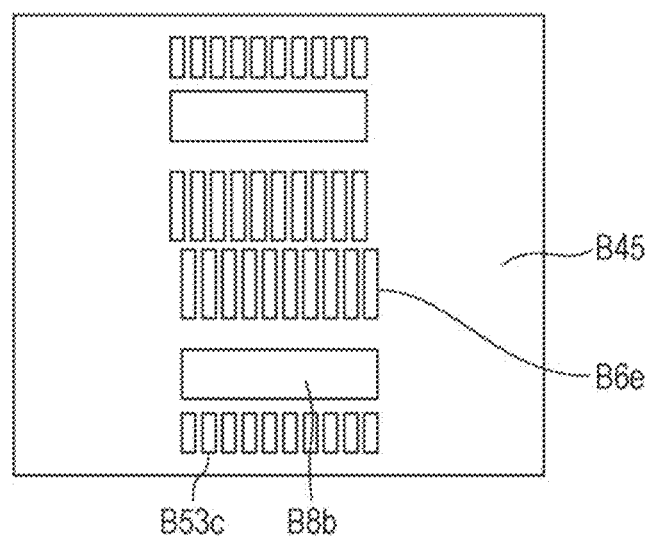
FIG. 13E is a plan view of each member constituting the flow path member of the ink jet head shown in FIG. 9.

As shown in FIG. 13E, the same plate-shaped member B45 has formed therein a through-groove section B6e constituting the individual ink chamber B6; a through-groove section B8b which forms an ink chamber in the downstream of the filter, and in which the direction of the nozzle arrangement constituting the ink inlet section B8 is the longitudinal direction; and a through-groove section B53c in which the direction of the nozzle arrangement constituting the circulation path B53 is the longitudinal direction.

Figure 13F:
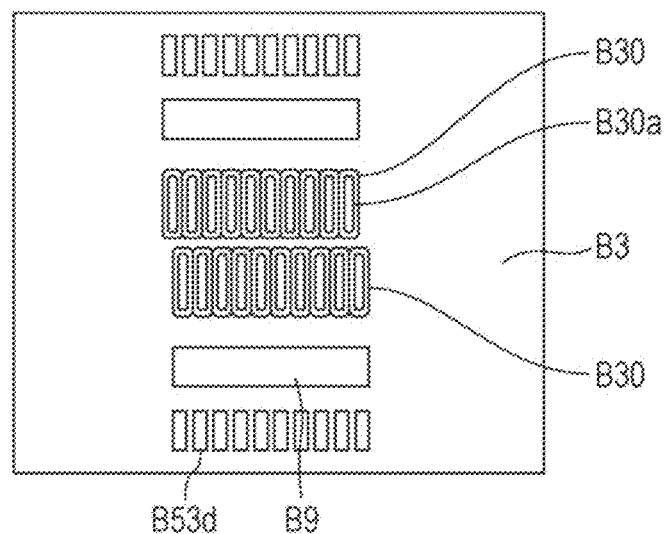
FIG. 13F is a plan view of each member constituting the flow path member of the ink jet head shown in FIG. 9.

As shown in FIG. 13F, the vibrating plate member B3 has formed therein a vibration region B30, the filter section B9, and a through-groove section B53d in which the direction of the nozzle arrangement constituting the circulation path B53 is the longitudinal direction.

As such, a complicated flow path can be formed with a simple configuration by configuring the flow path member by laminating and joining a plurality of plate-shaped members.

Based on the above-described configuration, the flow path member B40 composed of the flow path plate B2 and the vibrating plate member B3 has formed therein the fluid resistance section B51 along the planar direction of the flow path plate B2 that communicates with the respective individual ink chambers B6; and the circulation path B52 as well as the circulation path B53 that is in the thickness direction of the flow path member B40 communicating with the circulation path B52. The circulation path B53 communicates with the circulation common ink chamber B50, which will be described later.

On the other hand, the common ink chamber member B20 has a common ink chamber B10 and a circulation common ink chamber B50 formed therein.

As shown in FIG. 14A, the first common ink chamber member B21 constituting the common ink chamber member B20 has formed therein a through-hole B25a for a piezoelectric actuator, a through-groove section B10a that serves as a downstream common ink chamber B10A, and a groove section B50a that has a bottom and serves as a circulation common ink chamber B50.

As shown in FIG. 14B, the same second common ink chamber member B22 is provided with a through-hole B25b for a piezoelectric actuator, and a groove section B10b serving as an upstream common ink chamber B10B.

Furthermore, the second common ink chamber member B22 is provided with a through-hole B71a that serves as one end portion of the common ink chamber B10 in the direction of the nozzle arrangement and a supply port section communicating with the supply port B71.

Similarly, the first common ink chamber member B21 and the second common ink chamber member B22 are provided with through-holes B81a and B81b, which communicate with the other end of the circulation common ink chamber B50 in the direction of the nozzle arrangement and the circulation port B81.

In addition, FIG. 14 shows a groove section with a bottom that has been subjected to surface coating. The same applies to the following diagrams.

As such, the common ink chamber member B20 is composed of a first common ink chamber member B21 and a second common ink chamber member B22, and the first common ink chamber member B21 is joined to the vibrating plate member B3 side of the flow path member B40 while the second common ink chamber member B22 is laminated and joined to the first common ink chamber member B21.

Here, the first common ink chamber member B21 forms a downstream common ink chamber B10A, which is a portion of the common ink chamber B10 communicating with the ink inlet section B8, and a circulation common ink chamber B50 communicating with the circulation path B53. Furthermore, the second common ink chamber member B22 forms the upstream common ink chamber B10B, which is the rest of the common ink chamber B10.

At this time, the downstream common ink chamber B10A, which is a portion of the common ink chamber B10, and the circulation common ink chamber B50 are disposed in parallel with the direction orthogonally intersecting the direction of the nozzle arrangement, and the circulation common ink chamber B50 is disposed at a position projected into the common ink chamber B10.

As a result, the dimensions of the circulation common ink chamber B50 are not subjected to limitations according to the dimensions required for a flow path including the individual ink chambers B6, the fluid resistance section B7, and the ink inlet section B8, which are formed by the flow path member B40.

Then, since the circulation common ink chamber B50 and a portion of the common ink chamber B10 are disposed in parallel, and the circulation common ink chamber B50 is disposed at a position projected into the common ink chamber B10, the width of the head in a direction orthogonally intersecting the direction of the nozzle arrangement can be suppressed, and an increase in the size of the head can be suppressed. The common ink chamber member B20 forms the common ink chamber B10 and the circulation common ink chamber B50, to which an ink composition for ink jet textile printing is supplied from a head tank or an ink cartridge.

On the other hand, disposed on the opposite side of the vibrating plate member B3 from the individual ink chambers B6 is a piezoelectric actuator B11 that includes an electromechanical conversion element as a driving unit that deforms the vibration region B30 of the vibrating plate member B3.

As shown in FIG. 11, this piezoelectric actuator B11 has a piezoelectric member B12 joined onto a base member B13, and the piezoelectric member B12 is grooved by half-cut dicing to form a required number of columnar piezoelectric elements B12A and B12B are formed, for one piezoelectric member B12, in a comb teeth shape at a predetermined interval.

Here, the piezoelectric element B12A of the piezoelectric member B12 is used as a piezoelectric element to be driven by applying a drive waveform, and the piezoelectric element B12B is used as a mere prop without applying a drive waveform; however, all the piezoelectric elements B12A and B12B can also be used as piezoelectric elements to be driven.

Then, the piezoelectric element B12A is joined to a convex portion B30a, which is an island-shaped thick portion formed in the vibration region B30 of the vibrating plate member B3. Furthermore, the piezoelectric element B12B is joined to a convex portion B30b, which is a thick portion of the vibrating plate member B3.

This piezoelectric member B12 is formed by alternately laminating piezoelectric layers and internal electrodes, the internal electrodes are respectively drawn out to the end faces to provide external electrodes, and the flexible wiring member B15 is coupled to the external electrodes.

In an ink jet head B424 as a circulation type discharge head configured as such, for example, the piezoelectric element B12A contracts as the voltage applied to the piezoelectric element B12A is lowered from the reference potential, and the ink composition for ink jet textile printing flows into the individual ink chamber B6 as the vibration region B30 of the vibrating plate member B3 is lowered to cause the volume of the individual ink chamber B6 expands.

Thereafter, when the voltage applied to the piezoelectric element B12A is increased to extend the piezoelectric element B12A in the direction of lamination, and the vibration region B30 of the vibrating plate member B3 is deformed in a direction facing toward the nozzle B4 to cause the volume of the individual ink chamber B6 to contract, the ink composition for ink jet textile printing in the individual ink chamber B6 is pressurized, and the ink composition for ink jet textile printing is discharged through the nozzle B4.

Then, by returning the voltage applied to the piezoelectric element B12A to the reference potential, the vibration region B30 of the vibrating plate member B3 is restored to the initial position, the individual ink chambers B6 expand to generate negative pressure, and accordingly, at this time, the ink composition for ink jet textile printing is filled from the common ink chamber B10 into the individual ink chambers B6. Thus, after the vibration of the meniscus surface at the nozzle B4 is attenuated and stabilized, the operation for the next discharge is started.

The method of driving this head is not limited to the above-described example, and pull-strike or push-strike may be performed depending on the drive waveform. Furthermore, the above-described embodiment has been described by using a laminated type piezoelectric element has been described as the pressure generating unit that applies pressure fluctuation to the individual ink chamber B6; however, the present disclosure is not limited to this, and a thin-film piezoelectric element can also be used. Moreover, a system in which a heat-generating resistor is disposed in the individual ink chamber B6 so as to generate air bubbles by the heat generated by the heat-generating resistor and to cause pressure fluctuation, or a system in which pressure fluctuation is caused by using electrostatic force, can be used.

Next, an example of an ink circulation system using an ink jet head as a circulation type discharge head will be described with reference to FIG. 15.

As shown in FIG. 15, the ink circulation system is composed of a main tank B410, an ink jet head B424, a supply tank B417, a circulation tank B415, a compressor B422, a vacuum pump B421, a first liquid feeding pump B416, a second liquid feeding pump B412, a regulator B419, a supply-side pressure sensor B418, and a circulation side pressure sensor B423. The supply-side pressure sensor B418 is disposed between the supply tank B417 and the ink jet head B424 and is coupled to a supply flow path side that is led to the supply port B71 of the ink jet head B424. The circulation-side pressure sensor B423 is disposed between the ink jet head B424 and the circulation tank B415 and is coupled to the circulation path side that is led to the circulation port B81 of the ink jet head B424.

One of the circulation tanks B415 is coupled to the supply tank B417 via the first liquid feeding pump B416, and the other one of the circulation tanks B415 is coupled to the main tank B410 via the second liquid feeding pump B412. As a result, the ink composition for ink jet textile printing flows from the supply tank B417 through the supply port B71 into the ink jet head B424, is discharged through the circulation port B81, and is discharged to the circulation tank B415, the ink composition for ink jet textile printing is further transported from the circulation tank B415 to the supply tank B417 by the first liquid feeding pump B416, and thereby the ink composition for ink jet textile printing is circulated.

Furthermore, the compressor B422 is linked to the supply tank B417 and is controlled such that a predetermined positive pressure is detected by the supply-side pressure sensor B418. On the other hand, the vacuum pump B421 is linked to the circulation tank B415 and is controlled such that a predetermined negative pressure is detected by the circulation side pressure sensor B423. As a result, the negative pressure of the meniscus can be kept constant while circulating the ink composition for ink jet textile printing through the ink jet head B424.

Furthermore, when liquid droplets are discharged through the nozzle B4 of the ink jet head B424, since the amount of the ink composition for ink jet textile printing in the supply tank B417 and the circulation tank B415 decreases, it is preferable to replenish the ink composition for ink jet textile printing from the main tank B410 to the circulation tank by appropriately using the second liquid feeding pump B412. The timing of replenishing the ink composition for ink jet textile printing from the main tank B410 to the circulation tank B415 can be controlled by the detection results of the liquid level sensor or the like provided in the circulation tank B415, such that when the liquid level height of the ink composition for ink jet textile printing in the circulation tank B415 drops below a predetermined height, the ink composition for ink jet textile printing is replenished.

Next, the circulation of the ink composition for ink jet textile printing in the ink jet head B424 will be described. As shown in FIG. 9, a supply port B71 communicating with the common ink chamber B10 and a circulation port B81 communicating with the circulation common ink chamber B50 are formed at the end portion of the common ink chamber member B20. The supply port B71 and the circulation port B81 are led to the supply tank B417 and the circulation tank B415, which store the ink composition for ink jet textile printing, respectively, via a tube. Then, the ink composition for ink jet textile printing stored in the supply tank B417 is supplied to the individual ink chamber B6 via the supply port B71, the common ink chamber B10, the ink inlet section B8, and the fluid resistance section B7.

In addition, while the ink composition for ink jet textile printing in the individual ink chambers B6 is discharged through the nozzle B4 by driving the piezoelectric member B12, a portion or all of the ink composition for ink jet textile printing staying in the individual ink chambers B6 without being discharged is circulated to the circulation tank B415 via the fluid resistance section B51, the circulation paths B52 and B53, the circulation common ink chamber B50, and the circulation port B81.

The circulation of the ink composition for ink jet textile printing can be carried out not only when the ink jet head B424 is in operation but also when the operation is stopped. By circulating the ink composition for ink jet textile printing when the operation is stopped, the ink composition for ink jet textile printing in the individual ink chambers B6 is constantly refreshed, and aggregation and sedimentation of the components included in the ink composition for ink jet textile printing can be suppressed, which is preferable.

5. Dyed Product

A dyed product, which is a recorded material according to the present disclosure, is a product produced by using the above-mentioned ink composition for ink jet textile printing of the present disclosure, and the dyed product can be produced by using the above-mentioned recording method.

Thus, suitable embodiments of the present disclosure have been described above; however, the present disclosure is not intended to be limited to these.

For example, the ink jet device to which the present disclosure is applied is not limited to the above-mentioned ones. More specifically, the ink jet device to which the present disclosure is applied may be, for example, an ink jet device that does not have an ink circulation system.

Furthermore, the above-described embodiments have been described mainly based on the case where the recording medium to which the ink composition for ink jet textile printing of the present disclosure is applied by an ink jet method is a fabric; however, the recording medium to which the ink composition for ink jet textile printing of the present disclosure is applied by an ink jet method may be any recording medium. For example, the recording medium to which the ink composition for ink jet textile printing of the present disclosure is applied by an ink jet method may be paper such as plain paper; or an intermediate transfer medium such as a recording medium provided with an ink absorbing layer, which is referred to as special paper for ink jet or coated paper.

EXAMPLES

Next, specific examples of the present disclosure will be described.

6. Preparation of Ink Composition for Ink Jet Textile Printing

Example 1

First, a color material A represented by the above-described Formula (1), a color material B represented by the above-described Formula (2), C.I. Reactive Orange 12 as a color material C, triethylene glycol monobutyl ether, diethylene glycol, 2-pyrrolidone, urea, adipic acid, OLFINE PD002W (manufactured by Nissin Chemical Industry Co., Ltd.), an ethylenediaminetetraacetate, Proxel XL-2 (manufactured by Lonza Group), and ultrapure water were prepared.

By mixing these at a predetermined ratio, an ink composition for ink jet textile printing having the composition shown in Table 1 was prepared.

Examples 2 to 8

Ink compositions for ink jet textile printing were prepared in the same manner as in Example 1, except that the types of the components used for preparing the ink composition for ink jet textile printing, and the formulating ratio of each component were changed to obtain the compositions shown in Table 1.

Comparative Examples 1 to 5

Ink compositions for ink jet textile printing were prepared in the same manner as in Example 1, except that the types of the components used for preparing the ink composition for ink jet textile printing, and the formulating ratio of each component were changed to obtain the compositions shown in Table 1.

Table 1 shows together the conditions for each of the ink compositions for ink jet textile printing of the above-described Examples and Comparative Examples. In Table 1, C.I. Reactive Yellow 95 represented by the above-described Formula (3) is described as "RY95", C.I. Reactive Orange 12 represented by the above-described Formula (4) is described as "RO12", triethylene glycol monobutyl ether is described as "TEGmBE", diethylene glycol is described as "DEG", 2-pyrrolidone is described as "2-Py", ethylene glycol is described as "EG", propylene glycol is described as "PG", OLFINE PD002W (manufactured by Nissin Chemical Industry Co., Ltd.) is described as "PD002W", ethylenediaminetetraacetate is described as "EDTA", and Proxel XL-2 (manufactured by Lonza Group) is described as "XL-2". Furthermore, regarding the ink compositions for ink jet textile printing of the above-described Examples, the surface tension had a value in the range of from 23 mN/m to 30 mN/m in all cases. The surface tension was measured by a Wilhelmy method at 25° C. using a surface tension meter (manufactured by Kyowa Interface Science Co., Ltd., CBVP-7). Furthermore, the viscosity at 25° C. of the ink composition for ink jet textile printing of each of the above-described Examples had a value in the range of from 4 mPa·s to 6 mPa·s in all cases. The viscosity of the ink composition for ink jet textile printing was determined by measurement according to JIS Z8809 using a vibration type viscometer (VM-100, manufactured by Sekonic Corporation).

TABLE 1

| | Content [% by mass] | | | | | | | | | | | | | | |
|---|---|---|---|---|---|---|---|---|---|---|---|---|---|---|---|
| | Color material | | | | Organic solvent | | | | | | pH adjusting agent | Surfactant | Chelating agent | Antiseptic agent | |
| | Color material A | Color material B | Color material C | | | | | | | | Adipic | | | | |
| | | | RO12 | RY95 | TEGmBE | DEG | 2-Py | EG | PG | Urea | acid | PD002W | EDTA | XL-2 | Water |
| Example 1 | 3.60 | 3.60 | 1.80 | — | 3.0 | 18.0 | 4.0 | — | — | 4.0 | 0.02 | 1.0 | 0.02 | 0.3 | 60.66 |
| Example 2 | 1.50 | 1.50 | 6.00 | — | 3.0 | 18.0 | 4.0 | — | — | 4.0 | 0.02 | 1.0 | 0.02 | 0.3 | 60.66 |

TABLE 1-continued

| | Content [% by mass] | | | | | | | | | | | | | |
|---|---|---|---|---|---|---|---|---|---|---|---|---|---|---|
| | Color material | | | | Organic solvent | | | | | | pH adjusting agent | Surfactant | Chelating agent | Antiseptic agent | |
| | Color material A | Color material B | Color material C | | | | | | | Urea | Adipic acid | PD002W | EDTA | XL-2 | Water |
| | | | RO12 | RY95 | TEGmBE | DEG | 2-Py | EG | PG | | | | | | |
| Example 3 | 1.80 | 2.70 | — | 4.50 | 3.0 | 18.0 | 4.0 | — | — | 4.0 | 0.02 | 1.0 | 0.02 | 0.3 | 60.66 |
| Example 4 | 2.70 | 1.80 | — | 4.50 | 3.0 | 18.0 | 4.0 | — | — | 4.0 | 0.02 | 1.0 | 0.02 | 0.3 | 60.66 |
| Example 5 | 2.25 | 2.25 | — | 4.50 | — | — | 4.0 | 3.0 | 18.0 | 4.0 | 0.02 | 1.0 | 0.02 | 0.3 | 60.66 |
| Example 6 | 2.25 | 2.25 | — | 4.50 | 3.0 | 18.0 | 4.0 | — | — | 4.0 | 0.02 | 1.0 | 0.02 | 0.3 | 60.66 |
| Example 7 | 1.90 | 2.60 | 4.50 | — | 3.0 | 18.0 | 4.0 | — | — | 4.0 | 0.02 | 1.0 | 0.02 | 0.3 | 60.66 |
| Example 8 | 2.25 | 2.25 | 4.50 | — | — | 4.5 | — | 3.0 | 13.5 | 4.0 | 0.02 | 1.0 | 0.02 | 0.3 | 64.66 |
| Comparative Example 1 | 9.00 | — | — | — | 3.0 | 18.0 | 4.0 | — | — | 4.0 | 0.02 | 1.0 | 0.02 | 0.3 | 60.66 |
| Comparative Example 2 | — | 9.00 | — | — | 3.0 | 18.0 | 4.0 | — | — | 4.0 | 0.02 | 1.0 | 0.02 | 0.3 | 60.66 |
| Comparative Example 3 | 4.50 | 4.50 | — | — | 3.0 | 18.0 | 4.0 | — | — | 4.0 | 0.02 | 1.0 | 0.02 | 0.3 | 60.66 |
| Comparative Example 4 | 4.50 | — | — | 4.50 | 3.0 | 18.0 | 4.0 | — | — | 4.0 | 0.02 | 1.0 | 0.02 | 0.3 | 60.66 |
| Comparative Example 5 | — | 4.50 | 4.50 | — | 3.0 | 18.0 | 4.0 | — | — | 4.0 | 0.02 | 1.0 | 0.02 | 0.3 | 60.66 |

7. Evaluation

The ink composition for ink jet textile printing of each of the above-described Examples and Comparative Examples was evaluated as follows.

7-1. Evaluation of Clogging

The ink jet device as shown in FIG. 1 to FIG. 6 was prepared, the ink jet device was filled with an ink composition for ink jet textile printing, a nozzle check pattern was printed to check that there was no defective filling or nozzle clogging, and the head was left to stand in a state of being returned to the home position for 2 weeks in an environment of 40° C./20% RH.

After being left to stand, a nozzle check pattern was printed to observe the discharge status of the nozzle, and evaluation was performed according to the following criteria. Grade B or higher was regarded as a favorable level.
 A: Ink was normally discharged through all nozzles after one-time cleaning.
 B: Ink was normally discharged through all nozzles after cleaning in the range of 2 to 5 times.
 C: Ink was normally discharged through all nozzles after cleaning in the range of 6 to 10 times.
 D: Ink was not normally discharged through all nozzles even after cleaning was performed 11 or more times.

7-2. Evaluation of Discharge Stability

An ink jet device such as shown in FIG. 1 to FIG. 6 was filled with an ink composition for ink jet textile printing, and the ink composition for ink jet textile printing was continuously discharged for 10 hours and was evaluated according to the following criteria. Meanwhile, cleaning was performed every 2 hours. Grade C or higher was regarded as a favorable level.
 A: Non-discharge or discharge turbulence does not occur during discharge.
 B: Non-discharge, discharge turbulence, or the like occurs to a small extent during discharge; however, a normal status is restored during discharge.
 C: Non-discharge or discharge turbulence occurs to a small extent during discharge, and a normal status is not restored during discharge but is restored by cleaning.
 D: Non-discharge or discharge turbulence occurs to a small extent during discharge, and a normal status is not restored during discharge and is not restored even by cleaning.

7-3. Evaluation of Light Fastness

An ink jet device as shown in FIG. 1 to FIG. 6 was filled with an ink composition for ink jet textile printing, and a pattern with a gradation of 100% to 10% was printed on a cotton fabric at a resolution of 1440×720 dpi using the ink composition for ink jet textile printing.

After printing, the cotton fabric was subjected to a steaming treatment using a steamer for 12 minutes under highly humidified conditions at 102° C. and was further washed using an aqueous solution including 0.2% by mass of LACCOL STA (manufactured by Meisei Chemical Works, Ltd., surfactant) at 90° C. for 10 minutes and then dried to obtain a dyed product. The obtained dyed product was subjected to an evaluation of light fastness according to ISO 105-B02:1994 using a Xenon light fastness testing machine and was evaluated according to the following criteria. Grade C or higher was regarded as a favorable level.
 A: The portion with the lowest level is grade 5 or higher.
 B: The portion with the lowest level is grade 4 or higher and lower than grade 5.
 C: The portion with the lowest level is grade 3 or higher and lower than grade 4.
 D: The portion with the lowest level is lower than grade 3.

7-4. Evaluation of Bleeding

An ink jet device such as shown in FIG. 1 to FIG. 6 was filled with the ink composition for ink jet textile printing of Example 1 as a yellow ink and was also filled with black ink T41Y110 (manufactured by Seiko Epson Corporation, reactive ink for textile printing), and a bleed pattern of yellow ink and black ink was printed on a cotton fabric.

After printing, the cotton fabric was subjected to a steaming treatment using a steamer for 12 minutes under highly humidified conditions at 102° C. and was further washed using an aqueous solution including 0.2% by mass of LACCOL STA (manufactured by Meisei Chemical Works, Ltd., surfactant) at 90° C. for 10 minutes and then dried to obtain a dyed product.

A dyed product was obtained in the same manner as described above, except that each of the ink compositions for ink jet textile printing of the Examples other than Example 1 and the Comparative Examples was used instead of the ink composition for ink jet textile printing of Example 1.

The bleed pattern of the dyed product produced by using the ink composition for ink jet textile printing of each of the above Examples and Comparative Examples was visually observed. The degree of bleeding between the yellow pattern portion formed with the yellow ink and the black pattern portion formed with the black ink adjacent to the yellow pattern portion was observed. More specifically, the bleeding width of the black ink with respect to the yellow pattern portion was observed. Evaluation was performed according to the following criteria.

A: The maximum width of the bleeding portion is 100 μm or less.
B: The maximum width of the bleeding portion is more than 100 μm and 150 μm or less.
C: The maximum width of the bleeding portion is more than 150 μm and 300 μm or less.
D: The maximum width of the bleeding portion is more than 300 μm and 450 μm or less.
E: The maximum width of the bleeding portion is more than 450 μm.

These results are shown together in Table 2.

TABLE 2

| | Evaluation of clogging | Evaluation of discharge stability | Evaluation of light fastness | Evaluation of bleeding |
|---|---|---|---|---|
| Example 1 | B | B | C | C |
| Example 2 | B | B | C | C |
| Example 3 | A | C | B | B |
| Example 4 | A | C | B | B |
| Example 5 | A | B | A | C |
| Example 6 | A | B | A | A |
| Example 7 | A | A | A | A |
| Example 8 | B | B | A | B |
| Comparative Example 1 | D | C | D | C |
| Comparative Example 2 | D | D | D | C |
| Comparative Example 3 | C | C | D | C |
| Comparative Example 4 | D | D | C | B |
| Comparative Example 5 | C | D | C | B |

As is clear from Table 2, excellent results were obtained in the present disclosure. In contrast to this, in the Comparative Examples, satisfactory results were not obtained.

Furthermore, evaluations were carried out in the same manner as in the above-described sections 7-3 and 7-4, except that the fabric was changed to a silk fabric and the steaming treatment time was changed to 20 minutes, and results similar to those described above were obtained.

In addition, dyed products were produced in the same manner as described above, except that an ink jet device having the configuration shown in FIG. 7 to FIG. 17 was used instead of the ink jet device having the configuration shown in FIG. 1 to FIG. 6, and were subjected to evaluations in the same manner as described above, and results similar to those described above were obtained.

What is claimed is:

1. An ink composition for ink jet textile printing, the ink composition comprising a color material, a water-soluble organic solvent, and water, wherein
the color material contains a color material A represented by Formula (1) below, a color material B represented by Formula (2) below, and a color material C that has a triazine structure and that is different from the color material A and the color material B and includes C.I. Reactive Orange 12, and
wherein a ratio of a sum of a content of the color material A and a content of the color material B to a content of the color material C in the ink composition for ink jet textile printing is 1.0:2.0 to 4.0:1.0 in terms of mass ratio

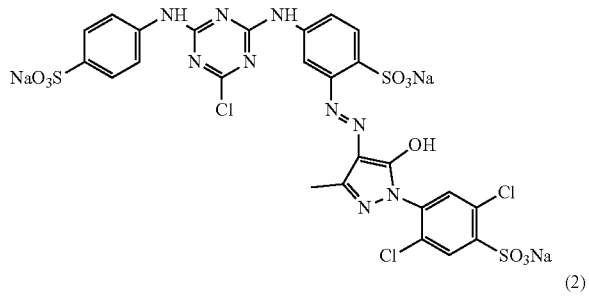

(1)

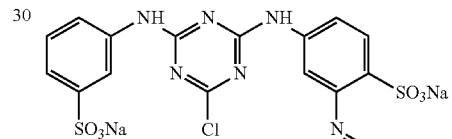

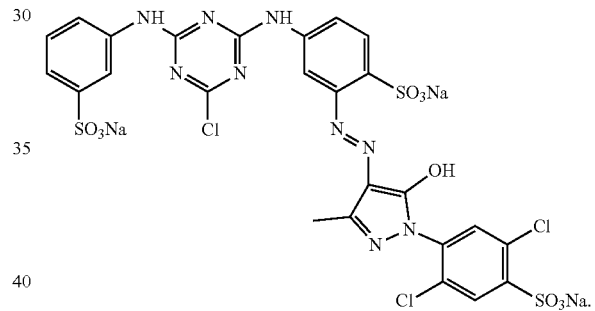

(2)

2. The ink composition for ink jet textile printing according to claim 1, wherein a ratio of a content of the color material A to a content of the color material B in the ink composition for ink jet textile printing is 2.0:3.0 to 3.0:2.0 in terms of mass ratio.

3. The ink composition for ink jet textile printing according to claim 1, wherein the water-soluble organic solvent contains a component having an SP value of 14 or less.

4. The ink composition for ink jet textile printing according to claim 3, wherein a ratio of a content of the component having the SP value of 14 or less to a total amount of the color material in the ink composition for ink jet textile printing is 0.5 or more in terms of mass ratio.

5. The ink composition for ink jet textile printing according to claim 3, wherein a ratio of the content of the component having the SP value of 14 or less to a total amount of the color material C in the ink composition for ink jet textile printing is 1.0 or more in terms of mass ratio.

6. A recording method comprising discharging the ink composition for ink jet textile printing according to claim 1 by an ink jet method and attaching the ink composition for ink jet textile printing to a recording medium.

* * * * *